US012791929B2

(12) United States Patent
Okuda et al.

(10) Patent No.: US 12,791,929 B2
(45) Date of Patent: Nov. 10, 2026

(54) PROJECTION DISPLAY APPARATUS

(71) Applicant: Panasonic Intellectual Property Management Co., Ltd., Osaka (JP)

(72) Inventors: Michihiro Okuda, Osaka (JP); Aya Kurita, Osaka (JP)

(73) Assignee: PANASONIC PROJECTOR & DISPLAY CORPORATION, Osaka (JP)

(*) Notice: Subject to any disclaimer, the term of this patent is extended or adjusted under 35 U.S.C. 154(b) by 130 days.

(21) Appl. No.: 17/838,793

(22) Filed: Jun. 13, 2022

(65) Prior Publication Data

US 2022/0308434 A1 Sep. 29, 2022

Related U.S. Application Data

(63) Continuation of application No. PCT/JP2021/000962, filed on Jan. 14, 2021.

(30) Foreign Application Priority Data

Jan. 20, 2020 (JP) ................................ 2020-006914

(51) Int. Cl.
*G03B 21/20* (2006.01)

(52) U.S. Cl.
CPC ....... *G03B 21/208* (2013.01); *G03B 21/2033* (2013.01)

(58) Field of Classification Search
CPC .......................... G03B 21/208; G03B 21/2033
(Continued)

(56) References Cited

U.S. PATENT DOCUMENTS

| | | | | |
|---|---|---|---|---|
| 9,310,033 | B2 * | 4/2016 | Yamada | H04N 9/3152 |
| 2008/0165401 | A1 * | 7/2008 | Kasazumi | G02B 27/48 359/707 |

(Continued)

FOREIGN PATENT DOCUMENTS

| | | |
|---|---|---|
| JP | 2013120250 A * | 6/2013 |
| JP | 2017-135026 | 8/2017 |

(Continued)

OTHER PUBLICATIONS

Translationof2017135026 (Year: 2024).*

(Continued)

*Primary Examiner* — Jerry L Brooks
(74) *Attorney, Agent, or Firm* — Wenderoth, Lind & Ponack, L.L.P.

(57) ABSTRACT

A projection display apparatus of the present disclosure includes a solid-state light source array that includes a plurality of solid-state light sources, a first diffuser plate that diffuses light emitted from the solid-state light source array, a light uniformizing element that uniformizes the light diffused by the first diffuser plate, a light modulation element that modulates the light uniformized by the light uniformizing element with an image signal to generate image light, and a projection unit that projects the image light generated by the light modulation element. The first diffuser plate has different diffusion characteristics in a first direction and a second direction perpendicular to the first direction, and allows the light emitted from the solid-state light source array to be transmitted through the first diffuser plate to diffuse the light emitted to have an aspect ratio of an angle distribution that is approximately 1.

20 Claims, 35 Drawing Sheets

(58) Field of Classification Search
USPC .......................................................... 353/94
See application file for complete search history.

(56) References Cited

U.S. PATENT DOCUMENTS

| | | | | |
|---|---|---|---|---|
| 2010/0165307 | A1 | 7/2010 | Mizushima et al. | |
| 2010/0271599 | A1* | 10/2010 | Miyazaki | G03B 21/208 353/38 |
| 2015/0124227 | A1* | 5/2015 | Kobayashi | G02B 27/0101 353/38 |
| 2016/0091784 | A1 | 3/2016 | Hu et al. | |
| 2018/0004076 | A1 | 1/2018 | Hu et al. | |
| 2018/0011394 | A1 | 1/2018 | Hu et al. | |
| 2019/0235372 | A1 | 8/2019 | Yamamoto | |
| 2020/0233289 | A1* | 7/2020 | Lin | G03B 21/204 |
| 2021/0389653 | A1 | 12/2021 | Hu et al. | |

FOREIGN PATENT DOCUMENTS

| | | |
|---|---|---|
| JP | 2017135026 A * | 8/2017 |
| JP | 2019-132986 | 8/2019 |
| WO | 2007/013221 | 2/2007 |
| WO | 2014/183581 | 11/2014 |

OTHER PUBLICATIONS

Translation of JP_2013120250_A (Year: 2026).*
International Search Report issued Mar. 23, 2021 in corresponding International Application No. PCT/JP2021/000962.

* cited by examiner

PROJECTION DISPLAY APPARATUS

BACKGROUND

1. Technical Field

The present disclosure relates to a projection display apparatus including a light source device that diffuses light emitted from a solid-state light source array by a diffuser plate and uniformizes the diffused light by a light uniformizing element.

2. Description of the Related Art

Patent Literature (PTL) 1 discloses a projection display apparatus that adjusts a divergence angle ratio between a major axis and a minor axis of a laser light flux by using an angle distribution control element in order to improve a degree of uniformity of the laser light flux to be emitted.

PTL 1 is International Patent Application Publication No. 2014/183581.

SUMMARY

The present disclosure provides a projection display apparatus including a light source device capable of suppressing speckle noise.

A projection display apparatus of the present disclosure includes a solid-state light source array that includes a plurality of solid-state light sources, a first diffuser plate that diffuses light emitted from the solid-state light source array, a light uniformizing element that uniformizes the light diffused by the first diffuser plate, a light modulation element that modulates the light uniformized by the light uniformizing element with an image signal to generate image light, and a projection unit that projects the image light generated by the light modulation element. The first diffuser plate has different diffusion characteristics in a first direction and a second direction perpendicular to the first direction, and allows the light emitted from the solid-state light source array to be transmitted through the first diffuser plate to diffuse the light emitted to have an aspect ratio of an angle distribution that is approximately 1.

According to the projection display apparatus of the present disclosure, speckle noise can be suppressed.

DETAILED DESCRIPTION

Hereinafter, exemplary embodiments will be described in detail with reference to the drawings as needed. However, unnecessarily detailed description may be omitted. For example, the detailed description of already well-known matters and the redundant description of configurations substantially identical to already-described configurations may be omitted. This is to avoid the description below from being unnecessarily redundant and thus to help those skilled in the art to easily understand the description.

Note that, the attached drawings and the following description are provided for those skilled in the art to fully understand the present disclosure, and are not intended to limit the subject matter described in the scope of claims.

First Exemplary Embodiment (Projection Display Apparatus)

Figure 1:
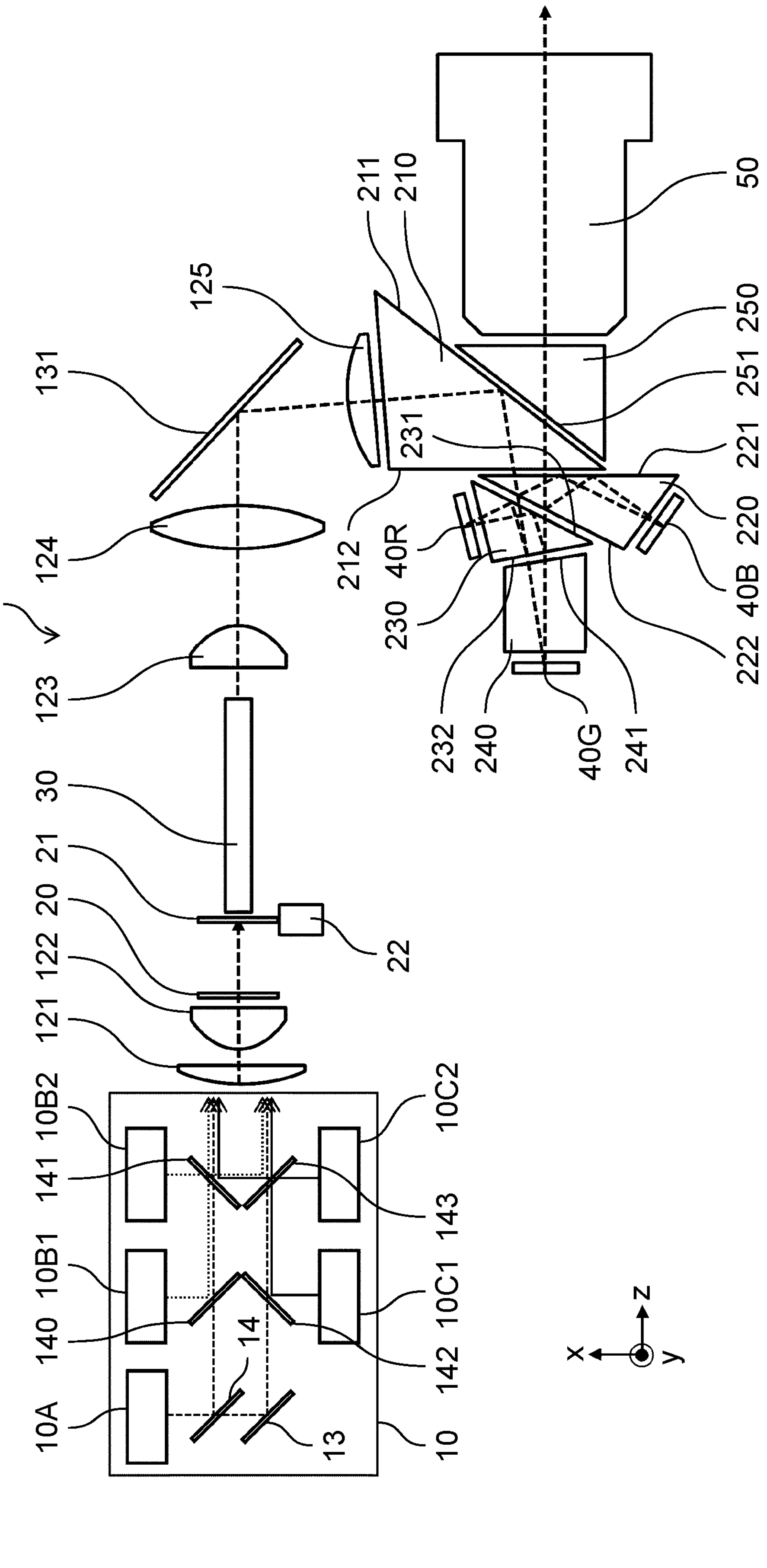
FIG. 1 is a diagram illustrating a projection display apparatus according to a first exemplary embodiment.

Hereinafter, a projection display apparatus according to a first exemplary embodiment will be described with reference to FIG. 1. FIG. 1 is a diagram of an optical configuration of projection display apparatus 100 according to the first exemplary embodiment.

As illustrated in FIG. 1, firstly, projection display apparatus 100 includes light source device 10 including first solid-state light source array 10A, second solid-state light source array 10B1, second solid-state light source array 10B2, third solid-state light source array 10C1, and third solid-state light source array 10C2, rod integrator 30, digital micromirror device (DMD) (generic name of three DMDs 40R, 40G, 40B), and projection unit 50.

Each of first solid-state light source array 10A, second solid-state light source arrays 10B1, 10B2, and third solid-state light source arrays 10C1, 10C2 includes, for example, a solid-state light source such as a laser diode (LD) or a light emitting diode (LED). In the present exemplary embodiment, a laser diode is used as the solid-state light source, particularly a laser diode that emits blue light (first color light) is used as first solid-state light source array 10A, laser diodes that emit green light (second color light) are used as second solid-state light source arrays 10B1, 10B2, and laser diodes that emit red light (third color light) are used as third solid-state light source arrays 10C1, 10C2. Here, the laser diode is an example of a laser light source. Note that, details of first solid-state light source array 10A, second solid-state light source arrays 10B1, 10B2, and third solid-state light source arrays 10C1, 10C2 will be described later (see FIG. 3).

Rod integrator 30 is a solid rod made from a transparent member such as glass. Rod integrator 30 uniformizes light emitted from light source device 10. Note that, rod integrator 30 may be a hollow rod whose inner wall is formed by a mirror surface. Here, rod integrator 30 is an example of a light uniformizing element that uniformizes light transmitted through diffuser plate 21 to be described later.

The DMD modulates light emitted from first solid-state light source array 10A, second solid-state light source arrays 10B1, 10B2, and third solid-state light source arrays 10C1, 10C2 based on image signals. Specifically, the DMD includes a plurality of micromirrors, and the plurality of micromirrors are movable. Each micromirror basically corresponds to one pixel. The DMD switches whether or not to reflect light to projection unit 50 side by changing an angle of each micromirror.

In the first exemplary embodiment, DMD 40R, DMD 40G, and DMD 40B are provided as the DMDs. DMD 40R modulates red component light R based on a red image signal. DMD 40G modulates green component light G based on a green image signal. DMD 40B modulates blue component light B based on a blue image signal. The DMD is an example of a light modulation element that modulates light obtained from the rod integrator with the image signal to generate image light.

Projection unit 50 enlarges and projects the image light modulated by the DMD onto a projection surface.

Secondly, projection display apparatus 100 includes necessary a lens group and a mirror group. Lenses 121 to 125 are provided as the lens group, and mirror 13, half mirror 14, mirror 131, and dichroic mirrors 140 to 143 are provided as the mirror group. Projection display apparatus 100 includes necessary diffuser plate 20 and diffuser plate 21.

Lens 121 and lens 122 are condenser lenses that concentrate light emitted from first solid-state light source array 10A, second solid-state light source arrays 10B1, 10B2, and third solid-state light source arrays 10C1, 10C2, and guide the light to rod integrator 30. Lens 123, lens 124, and lens 125 are relay lenses that substantially form an image of the light emitted from rod integrator 30 on DMDs 40R, 40G, 40B.

Mirror 13 and mirror 131 are mirrors that bend an optical path. Half mirror 14 is a mirror that separates light emitted from first solid-state light source array 10A, reflects a part of a light flux, and transmits the remaining light flux. Dichroic mirror 140 is a dichroic mirror that transmits blue light and reflects green light. Dichroic mirror 141 is a dichroic mirror that transmits blue light and green light and reflects red light. Dichroic mirror 142 is a dichroic mirror that transmits blue light and reflects red light. Dichroic mirror 143 is a dichroic mirror that transmits blue light and red light and reflects green light. Half mirror 14, mirror 13, and dichroic mirrors 140 to 143 are examples of optical elements constituting a light synthesizing unit. Note that, details of the dichroic mirrors will be described later (see FIGS. 5A to 5D).

Diffuser plate 20 is a diffuser plate that is disposed between light source device 10 including the first to third solid-state light source arrays and diffuser plate 21 at a subsequent stage of lens 122, and diffuses light incident on diffuser plate 21 and rod integrator 30 such that the light is not concentrated at one point. Here, diffuser plate 21 is an example of a first diffuser plate, and diffuser plate 20 is an example of a second diffuser plate. Diffuser plate 21 that diffuses the light emitted from light source device 10 including the first to third solid-state light source arrays is a diffuser plate that adjusts an angle distribution of the light incident on rod integrator 30. Movement mechanism 22 vibrates diffuser plate 21 in an x direction of FIG. 1 at a constant cycle. Details of actions of diffuser plate 20 and diffuser plate 21 will be described later (see FIGS. 6 to 10B). Diffuser plate 20 and diffuser plate 21 have, for example, a configuration in which fine irregularities are formed on a front surface of a glass substrate. A fine irregularity surface may be formed on one surface or both surfaces.

Thirdly, projection display apparatus 100 has a necessary prism group. Prism 210, prism 220, prism 230, prism 240, and prism 250 are provided as the prism group.

Prism 210 is made of a light-transmissive member, and has surface 211 and surface 212. An air gap is provided between prism 210 (surface 211) and prism 250 (surface 251), and since an angle (incident angle) at which the light incident on prism 210 is incident on surface 211 is larger than a total reflection angle, the light incident on prism 210 is reflected by surface 211. On the other hand, an air gap is provided between prism 210 (surface 212) and prism 220 (surface 221), and since an angle (incident angle) at which the light reflected by surface 211 is incident on surface 212 is smaller than a total reflection angle, the light reflected by surface 211 is transmitted through surface 212.

Prism 220 is made of a light-transmissive member, and has surface 221 and surface 222. Surface 222 is a dichroic mirror surface that transmits red component light R and green component light G and reflects blue component light B. Thus, of the light reflected by surface 211, red component light R and green component light G are transmitted through surface 222, and blue component light B is reflected by surface 222. Blue component light B reflected by surface 222 is reflected by surface 221.

An air gap is provided between prism 210 (surface 212) and prism 220 (surface 221), and since an angle (incident angle) at which blue component light B first reflected by surface 222 and blue component light B emitted from DMD 40B are incident on surface 221 is larger than a total reflection angle, blue component light B first reflected by surface 222 and blue component light B emitted from DMD 40B are reflected by surface 221. Blue component light B reflected by surface 222 is reflected by surface 221 and is incident on DMD 40B, and DMD 40B reflects the incident light and emits the reflected light as emission light. On the other hand, since an angle (incident angle) at which blue component light B reflected by surface 221 and then reflected by surface 222 for the second time is incident on surface 221 is smaller than a total reflection angle, blue component light B reflected by surface 221 and then reflected by surface 222 for the second time is transmitted through surface 221.

Prism 230 is made of a light-transmissive member, and has surface 231 and surface 232. Surface 232 is a dichroic mirror surface that transmits green component light G and reflects red component light R. Thus, of the light transmitted through surface 231, green component light G is transmitted through surface 232, and red component light R is reflected by surface 232. Red component light R reflected by surface 232 is reflected by surface 231. Green component light G emitted from DMD 40G is transmitted through surface 232.

An air gap is provided between prism 220 (surface 222) and prism 230 (surface 231), and since an angle (incident angle) at which red component light R transmitted through surface 231 and reflected by surface 232 and red component light R emitted from DMD 40R are incident on surface 231 again is larger than a total reflection angle, red component light R transmitted through surface 231 and reflected by surface 232 and red component light R emitted from DMD 40R are reflected by surface 231. Red component light R reflected by surface 232 is reflected by surface 231 and is incident on DMD 40R, and DMD 40R reflects the incident light and emits the reflected light as emitted light. On the other hand, since an angle (incident angle) at which red component light R emitted from DMD 40R, reflected by surface 231, and then reflected by surface 232 is incident on surface 231 again is smaller than a total reflection angle, red component light R emitted from DMD 40R, reflected by surface 231, and then reflected by surface 232 is transmitted through surface 231.

Prism 240 is made of a light-transmissive member and has surface 241. Surface 241 is configured to transmit green component light G. Note that, green component light G incident on DMD 40G and green component light G emitted from DMD 40G are transmitted through surface 241.

Prism 250 is made of a light-transmissive member and has surface 251.

In other words, blue component light B is (1) reflected by surface 211, is (2) transmitted through surface 212 and surface 221, is then reflected by surface 222, is (3) reflected by surface 221, is (4) reflected by DMD 40B, is (5) reflected by surface 221, is (6) reflected by surface 222, and is (7) transmitted through surface 221, surface 212, surface 211, and surface 251. Consequently, blue component light B is modulated by DMD 40B and is guided to projection unit 50.

Red component light R is (1) reflected by surface 211, is (2) transmitted through surface 212, surface 221, surface 222, and surface 231 and is then reflected by surface 232, is (3) reflected by surface 231, is (4) reflected by DMD 40R, is (5) reflected by surface 231, is (6) reflected by surface 232, and is (7) transmitted through surface 231, surface 222, surface 221, surface 212, surface 211, and surface 251. Consequently, red component light R is modulated by DMD 40R and is guided to projection unit 50.

Green component light G is (1) reflected by surface 211, is (2) transmitted through surface 212, surface 221, surface 222, surface 231, surface 232, and surface 241 and is then reflected by DMD 40G, and is (3) transmitted through surface 241, surface 232, surface 231, surface 222, surface 221, surface 212, surface 211, and surface 251. Consequently, green component light ray G is modulated by DMD 40G and is guided to projection unit 50.

(Light Source Device)

Figure 2:
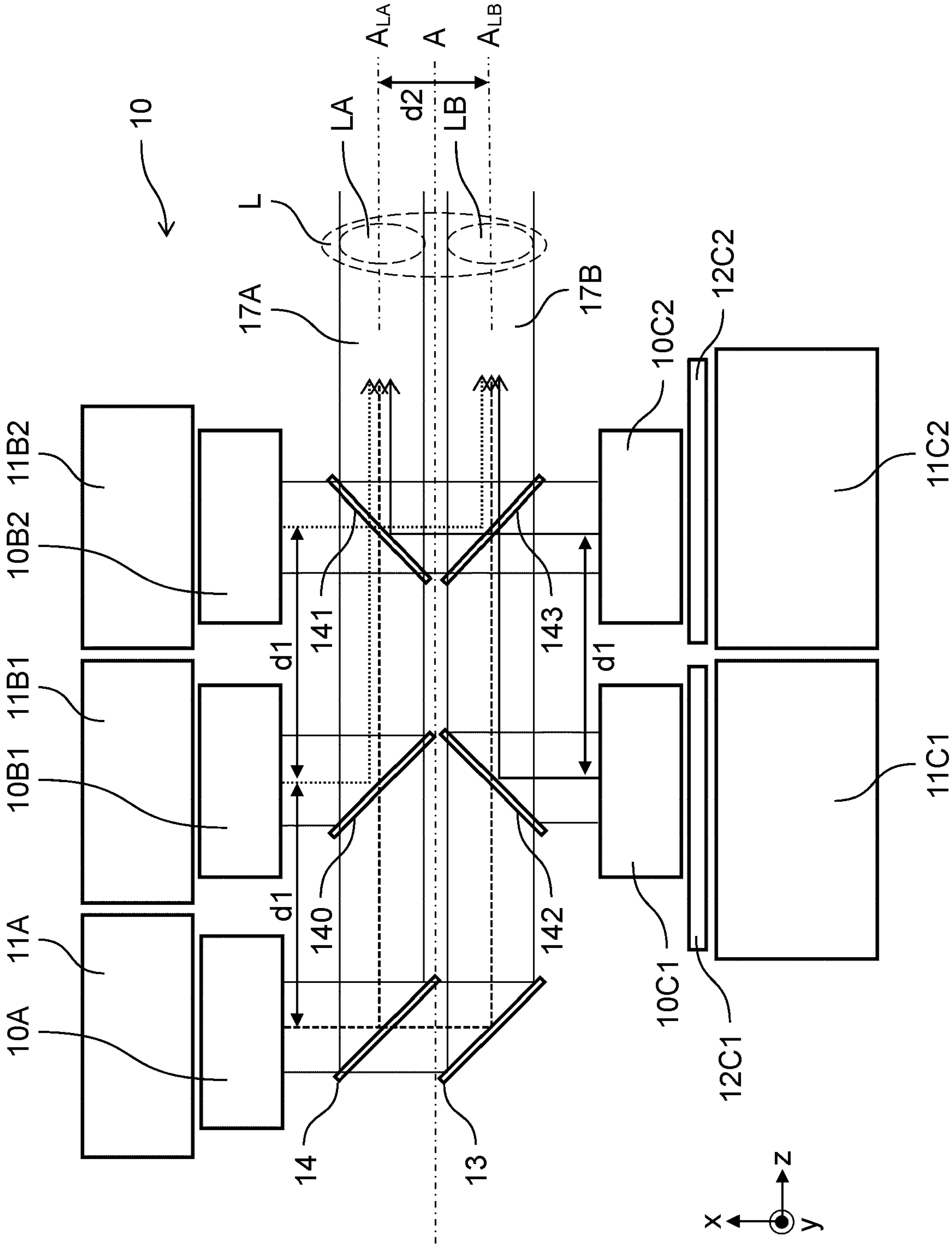
FIG. 2 is a diagram illustrating a light source device according to the first exemplary embodiment.

Hereinafter, the light source device according to the first exemplary embodiment will be described with reference to FIGS. 2 to 5D. FIG. 2 is a diagram illustrating light source device 10 according to the first exemplary embodiment.

In the first exemplary embodiment, light source device 10 used in the projection display apparatus illustrated in FIG. 1 mainly includes first solid-state light source array 10A, second solid-state light source arrays 10B1, 10B2, third solid-state light source arrays 10C1, 10C2, half mirror 14, mirror 13, and dichroic mirrors 140 to 143.

With optical axis A of light flux L emitted from the light synthesizing unit including half mirror 14, mirror 13, and dichroic mirrors 140 to 143 as a boundary, third solid-state light source array 10C1 and third solid-state light source array 10C2 are arranged at center interval d1 on one side, and first solid-state light source array 10A and second solid-state light source array 10B1, and second solid-state light source array 10B1 and second solid-state light source array 10B2 are arranged at center interval d1 on the other side.

A light flux reflected by half mirror 14, of the blue light emitted from first solid-state light source array 10A, green light emitted from second solid-state light source array 10B1, and red light emitted from third solid-state light source array 10C2 are synthesized by dichroic mirror 140 and dichroic mirror 141 to form light flux LA of white light, and travel through first optical path 17A.

A light flux transmitted through half mirror 14 and reflected by mirror 13, of the blue light emitted from first solid-state light source array 10A, green light emitted from second solid-state light source array 10B2, and red light emitted from third solid-state light source array 10C1 are synthesized by dichroic mirror 142 that reflects the red light and transmits the blue light and dichroic mirror 143 that reflects the green light and transmits the blue light and the red light to form light flux LB of white light, and travel through second optical path 17B.

At this time, assuming that an interval between optical axis $A_{LA}$ of light flux LA and optical axis $A_{LB}$ of light flux LB is center interval d2, positions of half mirror 14, mirror 13, and dichroic mirrors 140 to 143 are adjusted and arranged such that d1>d2 is satisfied. As a result, center interval d2 between light flux LA traveling through first optical path 17A and light flux LB traveling through second optical path 17B is narrower than center interval d1 between the color light rays emitted from the solid-state light source arrays (second solid-state light source arrays 10B1, 10B2 or third solid-state light source arrays 10C1, 10C2) arranged adjacent to each other. Note that, in the present exemplary embodiment, center interval d1 between the solid-state light source arrays has a common value, but can be appropriately adjusted.

Light source device 10 includes a necessary cooling mechanism group. The cooling mechanism group includes cooling mechanism 11A provided side by side with first solid-state light source array 10A, cooling mechanism 11B1 provided side by side with second solid-state light source array 10B1, cooling mechanism 11B2 provided side by side with second solid-state light source array 10B2, cooling mechanism 11C1 provided side by side with third solid-state light source array 10C1, and cooling mechanism 11C2 provided side by side with third solid-state light source array 10C2.

Cooling mechanism 11A, cooling mechanism 11B1, and cooling mechanism 11B2 are cooling mechanisms for respectively cooling first solid-state light source array 10A, second solid-state light source array 10B1, and second solid-state light source array 10B2 available under a high-temperature condition where a case temperature of the laser ranges from 50° C. to 70° C. inclusive. Here, the fact that the solid-state light source array is available under the high-temperature condition where the case temperature of the laser ranges from 50° C. to 70° C. inclusive means that the case temperature of the laser of each solid-state light source array is set to the range from 50° C. to 70° C. inclusive as a target cooling temperature of first solid-state light source array 10A, second solid-state light source array 10B1, and second solid-state light source array 10B2.

On the other hand, cooling mechanism 11C1 and cooling mechanism 11C2 are cooling mechanisms for respectively cooling third solid-state light source array 10C1 and third solid-state light source array 10C2 that need to be used under a low-temperature condition where the case temperature of the laser ranges from 20° C. to 40° C. inclusive, and are provided side by side with third solid-state light source array 10C1 and third solid-state light source array 10C2 with Peltier element 12C1 and Peltier element 12C2 interposed therebetween, respectively. Here, the fact that the solid-state light source arrays need to be used under the low-temperature condition where the case temperature of the laser ranges from 20° C. to 40° C. inclusive means that the laser case temperature of each solid-state light source array is set to the range from 20° C. to 40° C. inclusive as a target cooling temperature of third solid-state light source arrays 10C1, 10C2. Thus, in the present exemplary embodiment, third solid-state light source arrays 10C1, 10C2 are light source arrays that need to be used under a lowest target cooling temperature among the first to third solid-state light source arrays. The cooling mechanism group is bonded to a back surface of each of the first solid-state light source array, the second solid-state light source array, and the third solid-state light source array provided side by side via, for example, thermally conductive grease or the like. The cooling mechanism group is an example of a cooling device.

Figure 3:
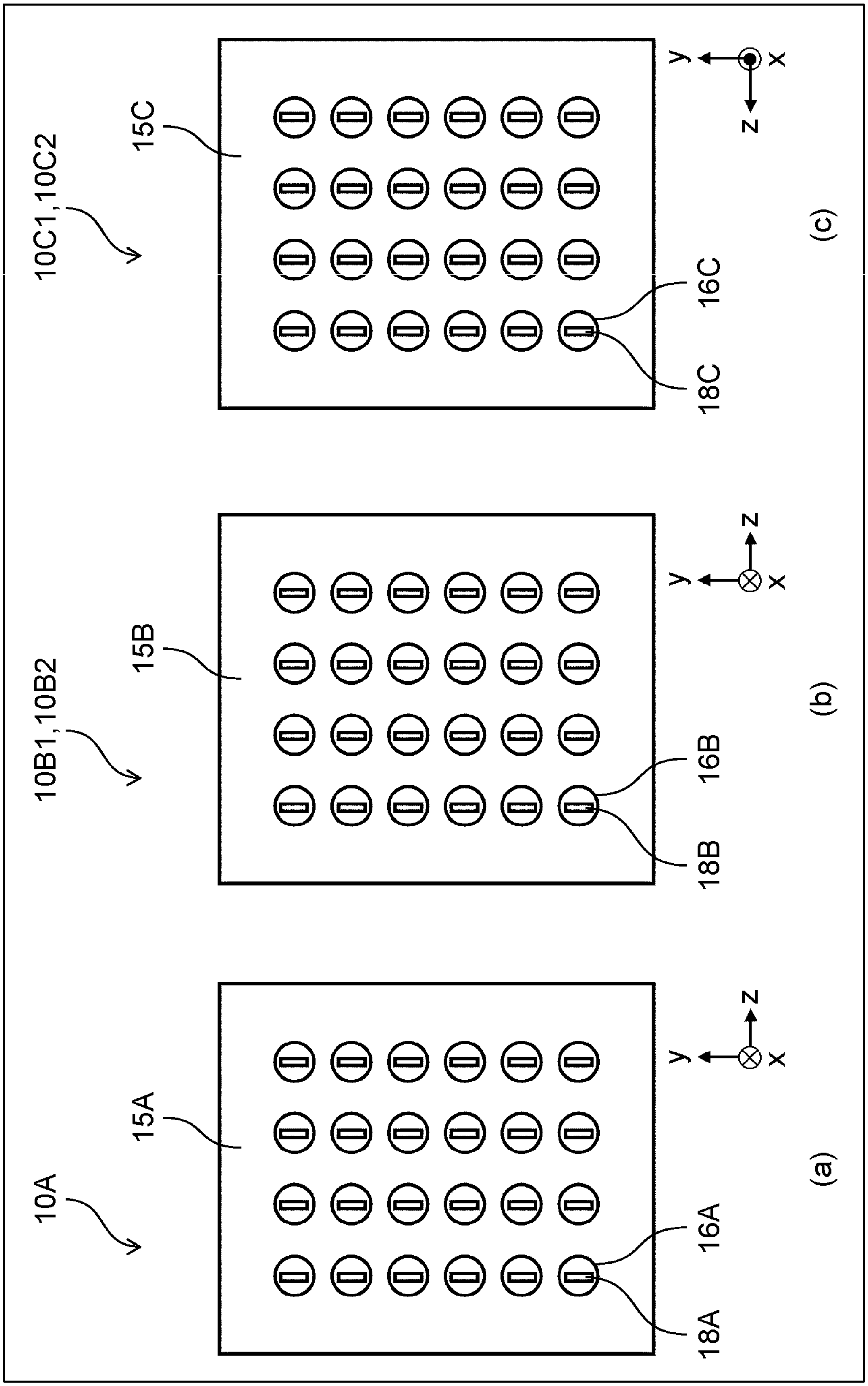
FIG. 3 is a diagram illustrating a solid-state light source array according to the first exemplary embodiment.

Part (a) of FIG. 3 is a diagram of first solid-state light source array 10A as viewed in an +x direction of FIG. 2, part (b) of FIG. 3 is a diagram of second solid-state light source array 10B1 and second solid-state light source array 10B2 as viewed in the +x direction of FIG. 2, and part (c) of FIG. 3 is a diagram of third solid-state light source array 10C1 and third solid-state light source array 10C2 as viewed in an −x direction of FIG. 2.

First solid-state light source array 10A includes a plurality of laser diodes 16A that emit blue light (first color light) having a dominant wavelength of 465 nm, second solid-state light source arrays 10B1 and 10B2 include a plurality of laser diodes 16B that emit green light (second color light) having a dominant wavelength of 525 nm, and third solid-state light source arrays 10C1, 10C2 include a plurality of laser diodes 16C that emit red light (third color light) having a dominant wavelength of 640 nm. Note that, the blue light may have another wavelength within a range from 440 nm to 470 nm inclusive, the green light may have another wavelength within a range from 515 nm to 550 nm inclusive, and the red light may have another wavelength within a range from 630 nm to 660 nm inclusive. Alternatively, a plurality of wavelengths within the above range may be used.

The blue and green laser diodes have relatively good temperature characteristics, can maintain reliability even under the high-temperature condition where the case temperature ranges from 50° C. to 70° C. inclusive, and have relatively little decrease in light output. On the other hand, since the red laser diode has poor temperature characteristics, it is difficult to maintain reliability under the high-temperature condition, and the light output decreases, it is necessary to maintain the case temperature in a range from 20° C. to 40° C. inclusive. First solid-state light source array 10A, second solid-state light source array 10B1, second solid-state light source array 10B2, third solid-state light source array 10C1, and third solid-state light source array 10C2 have a configuration in which four in a horizontal direction and six in a vertical direction, that is, a total of 24 laser diodes 16A, 16B, 16C are arrayed. Laser diodes 16A, 16B, 16C include emitters 18A, 18B, 18C from which light is emitted, respectively, and are integrated with a collimator lens that collimates the emitted light. Substantially collimated light is emitted from laser diodes 16A, 16B, 16C.

Emitters 18A, 18B, 18C are arranged such that an x-axis direction is a short side and a y-axis direction is a long side, and the x-axis direction is a Fast axis and the y-axis direction is a Slow axis. A long-side direction of an image of the emitter on an incident surface of rod integrator 30 is set to be identical to a long-side direction of rod integrator 30, and thus, the light flux can be more efficiently incident into the rod integrator. Note that, first solid-state light source array 10A that emits blue light (first color light) and second solid-state light source arrays 10B1, 10B2 that emit green light (second color light) have a Slow axis direction, that is, the y-axis direction as a polarization direction, and third solid-state light source arrays 10C1, 10C2 that emit red light (third color light) have a Fast axis direction, that is, the x-axis direction as a polarization direction. The numbers and arrays of laser diodes 16A, 16B, 16C included in the solid-state light source arrays are not limited thereto.

Figure 4:
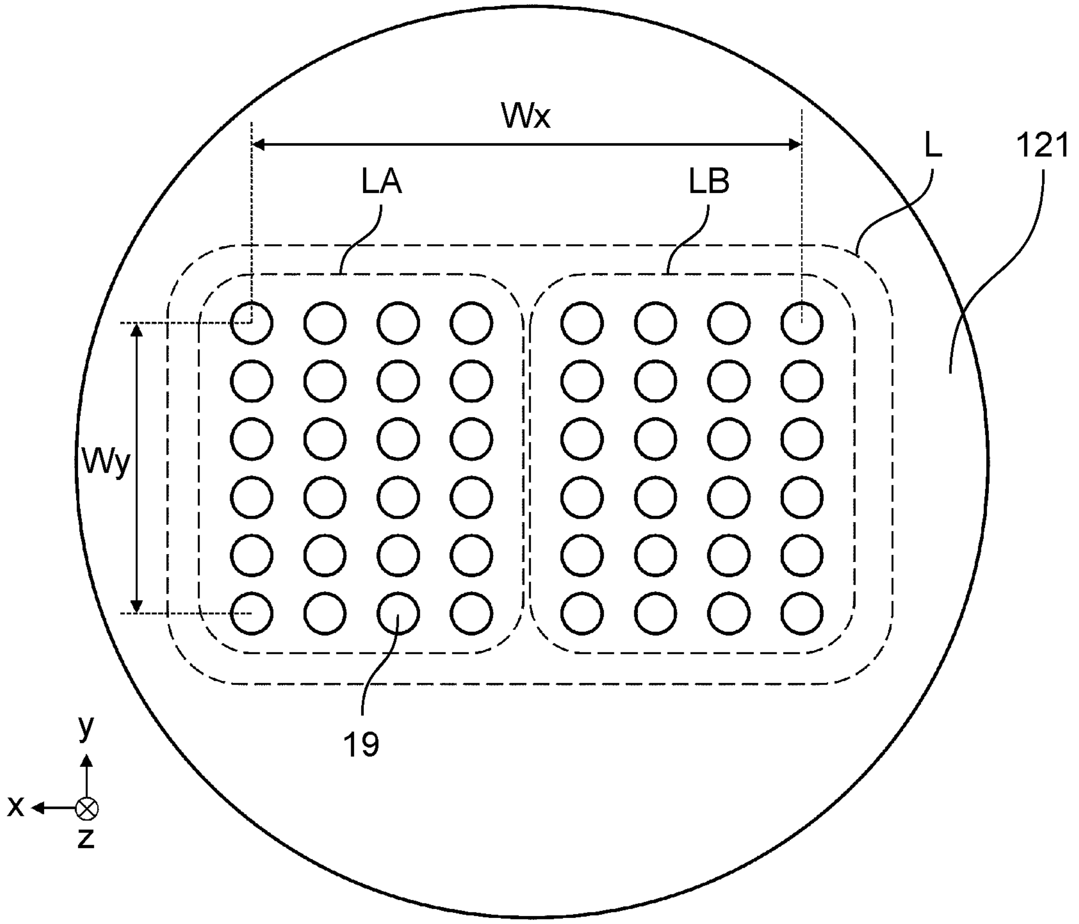
FIG. 4 is a diagram illustrating a light flux distribution after light source device emission according to the first exemplary embodiment.

FIG. 4 is a diagram illustrating the arrangement of light flux L incident on lens 121, and light flux L includes light flux LA traveling through first optical path 17A and light flux LB traveling through second optical path 17B. Light fluxes LA and LB include images 19 of the emitters in parts (a) to (c) of FIG. 3, and image 19 of each emitter is a white image in which blue light (first color light), green light (second color light), and red light (third color light) are synthesized. Assuming that a width in the x direction is light flux width Wx and a width in the y direction is light flux width Wy, light flux L satisfies Wx>Wy. Note that, since the numbers and arrays of laser diodes 16A, 16B, 16C included in the solid-state light source arrays are not limited thereto, images 19 of the emitters can be arranged such that the images of the emitters of blue light, green light, and red light are not superimposed.

Figure 5A:
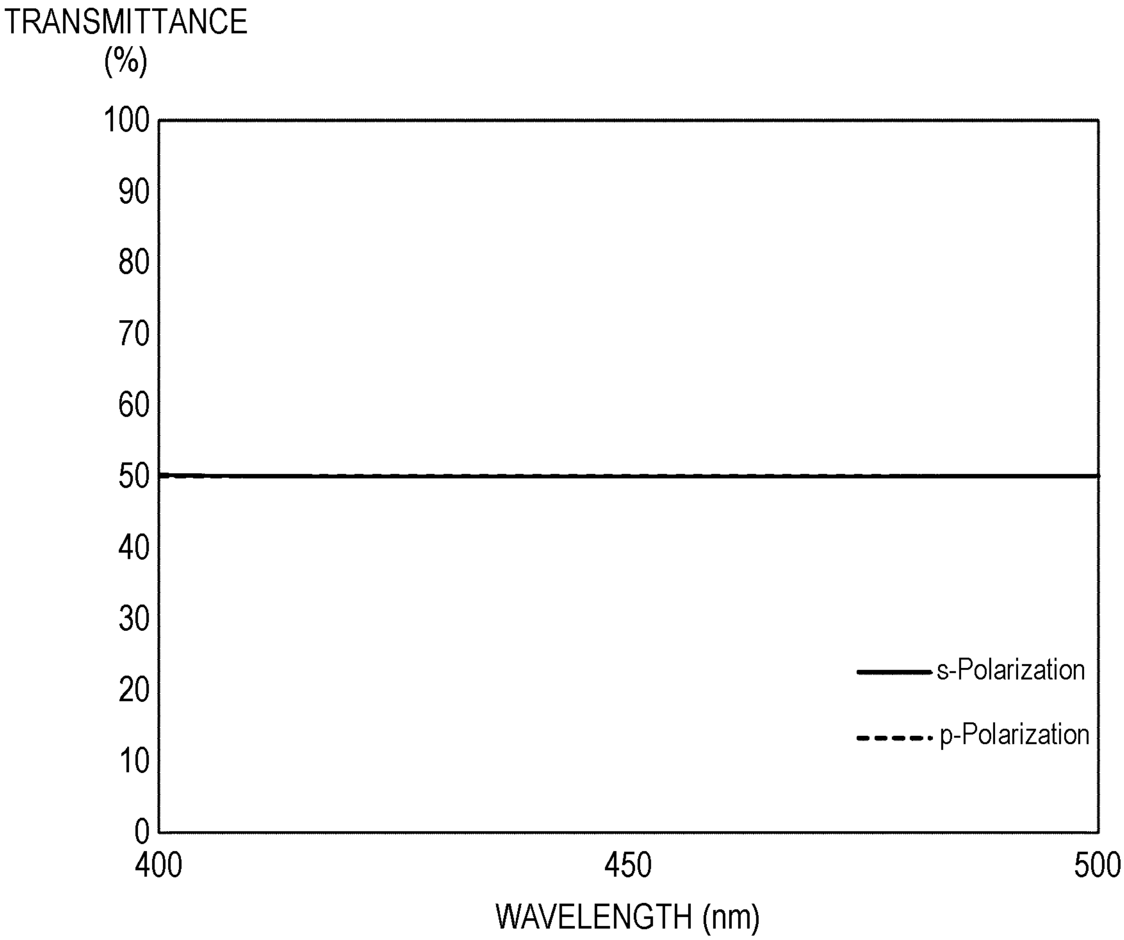
FIG. 5A is a characteristic diagram of a half mirror according to the first exemplary embodiment.

FIGS. 5A to 5D are characteristic diagrams illustrating transmission characteristics when light is incident on the half mirror and the dichroic mirror at an incident angle of 45°. FIG. 5A is a characteristic diagram of half mirror 14, and has characteristics that the half mirror transmits 50% of light having a wavelength in a range from 440 nm to 480 nm inclusive and reflects 50% of light for s-polarized incident light. In light source device 10, half mirror 14 transmits 50% and reflects 50% of s-polarized blue light (first color light) having a wavelength of 465 nm emitted from first solid-state light source array 10A.

Figure 5B:
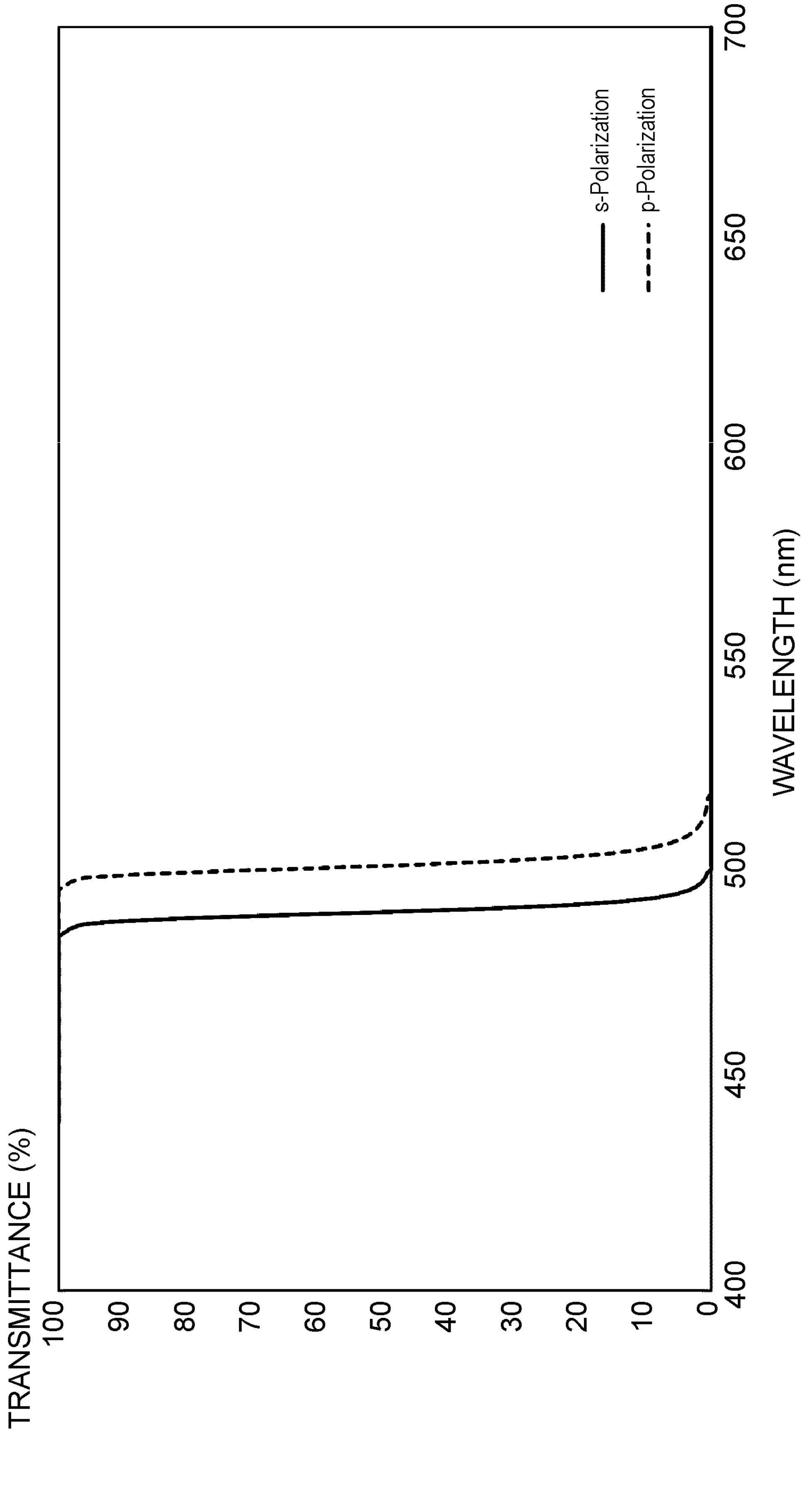
FIG. 5B is a characteristic diagram of dichroic mirror 140 according to the first exemplary embodiment.

FIG. 5B is a characteristic diagram of dichroic mirror 140, and has characteristics that the dichroic mirror transmits light having a wavelength of 480 nm or less and reflects light having a wavelength of 510 nm or more for both s-polarized incident light and p-polarized light. In light source device 10, dichroic mirror 140 transmits s-polarized blue light (first color light) having a dominant wavelength of 465 nm emitted from first solid-state light source array 10A, and reflects s-polarized green light (second color light) having a dominant wavelength of 525 nm emitted from second solid-state light source array 10B1.

Figure 5C:
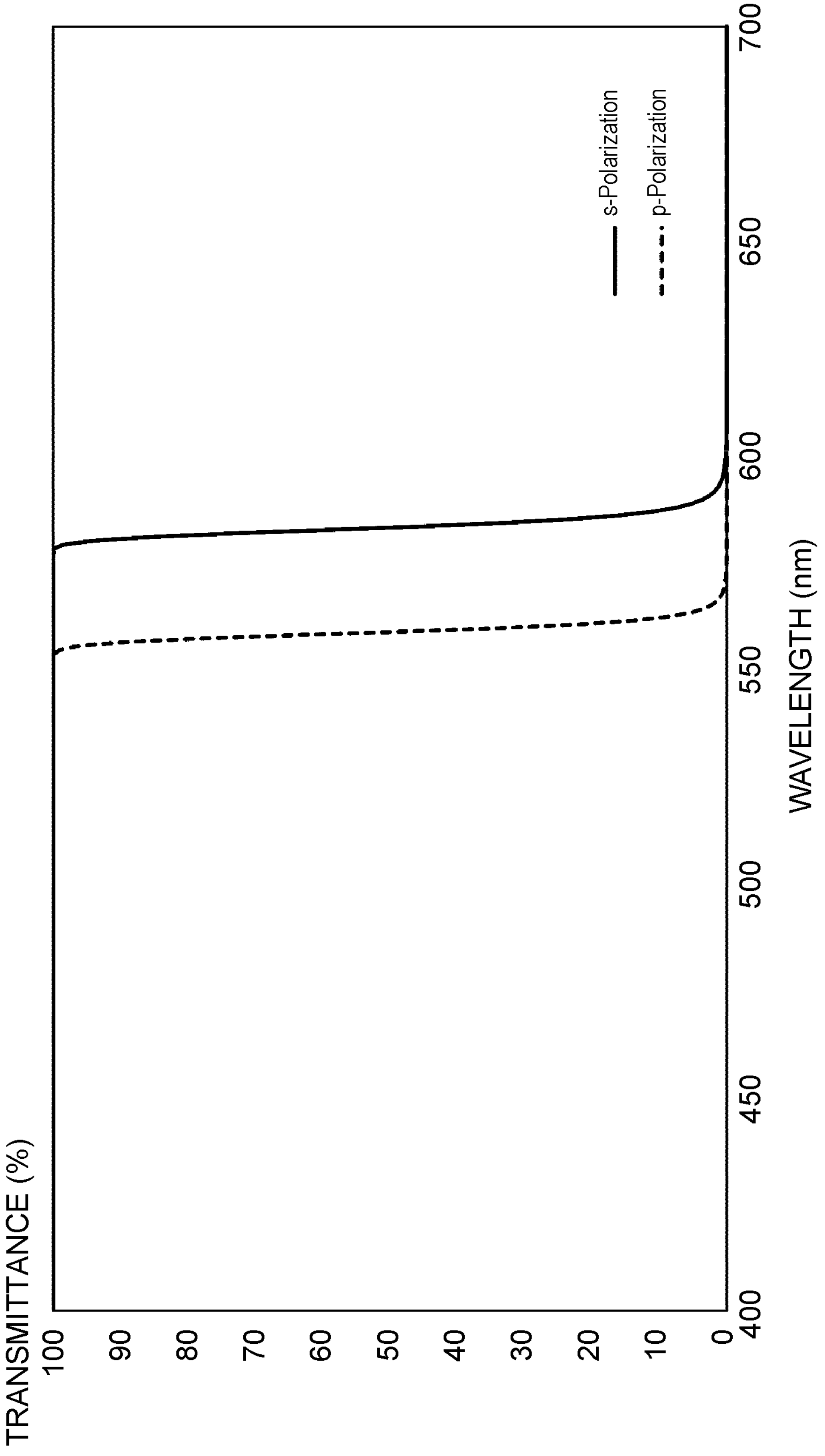
FIG. 5C is a characteristic diagram of dichroic mirrors 141, 142 according to the first exemplary embodiment.

FIG. 5C is a characteristic diagram of dichroic mirrors 141, 142, and has characteristics that the dichroic mirrors transmit light having a wavelength of 550 nm or less and reflect light having a wavelength of 570 nm or more for s-polarized incident light and transmit light having a wavelength of 574 nm or less and reflect light having a wavelength of 594 nm or more for p-polarized incident light. In light source device 10, dichroic mirror 141 transmits s-polarized blue light (first color light) having a dominant wavelength of 465 nm emitted from first solid-state light source array 10A and s-polarized green light (second color light) having a dominant wavelength of 525 nm emitted from second solid-state light source array 10B1 and second solid-state light source array 10B2 and reflects p-polarized red light (third color light) having a dominant wavelength of 640 nm emitted from third solid-state light source array 10C2. In light source device 10, dichroic mirror 142 transmits s-polarized blue light having a dominant wavelength of 465 nm emitted from first solid-state light source array 10A, and reflects p-polarized red light having a dominant wavelength of 640 nm emitted from third solid-state light source array 10C1.

Figure 5D:
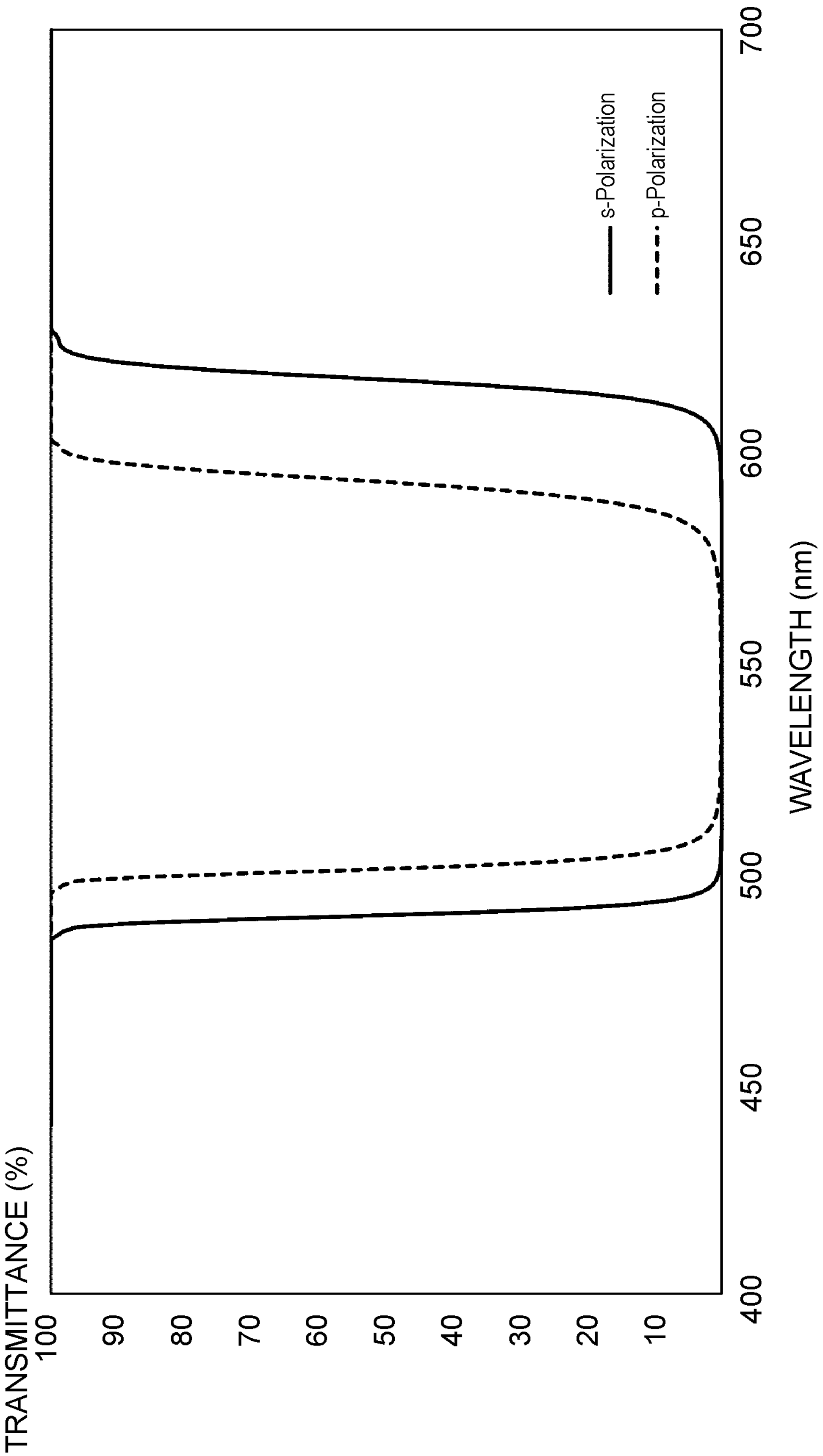
FIG. 5D is a characteristic diagram of dichroic mirror 143 according to the first exemplary embodiment.

FIG. 5D is a characteristic diagram of dichroic mirror 143, and has characteristics that the dichroic mirror transmits light having a wavelength of 480 nm or less and 630 nm or more and reflects light having a wavelength in a range from 510 nm to 540 nm inclusive for both s-polarized incident light and p-polarized incident light. In light source device 10, dichroic mirror 143 transmits s-polarized blue light (first color light) having a dominant wavelength of 465 nm emitted from first solid-state light source array 10A, reflects s-polarized green light (second color light) having a dominant wavelength of 525 nm emitted from second solid-state light source array 10B2, and transmits p-polarized red light (third color light) having a wavelength of 640 nm emitted from third solid-state light source array 10C1 and third solid-state light source array 10C2. Note that, a dichroic mirror having the characteristics of FIG. 5D may be used as dichroic mirror 140 in order to share the specification with dichroic mirror 143.

When the dichroic mirror having the characteristics of FIG. 5D is used as dichroic mirror 140, even though the positions of a pair of dichroic mirror 140 and dichroic mirror 142 and a pair of dichroic mirror 141 and dichroic mirror 143 are switched while the same angle as in FIG. 1 is maintained, light fluxes LA, LB of the white light can be formed. In this case, light flux LA traveling through first optical path 17A includes the light flux, of the blue light emitted from first solid-state light source array 10A, reflected by half mirror 14, the green light emitted from second solid-state light source array 10B2, and the red light emitted from third solid-state light source array 10C1. Light flux LB traveling through second optical path 17B includes the light flux, of the blue light emitted from first solid-state light source array 10A, transmitted through half mirror 14, the green light emitted from second solid-state light source array 10B1, and the red light emitted from third solid-state light source array 10C2.

However, when dichroic mirrors 140 to 143 have the arrangement of FIG. 1, it is possible to minimize a difference in a traveling optical path length between the color light rays of the same color. That is, it is possible to minimize an optical path length difference between green light (second color light) emitted from second solid-state light source array 10B1 and green light (second color light) emitted from second solid-state light source array 10B2, and an optical path length difference between red light (third color light) emitted from third solid-state light source array 10C1 and red light (third color light) emitted from third solid-state light source array 10C2.

Figure 6:
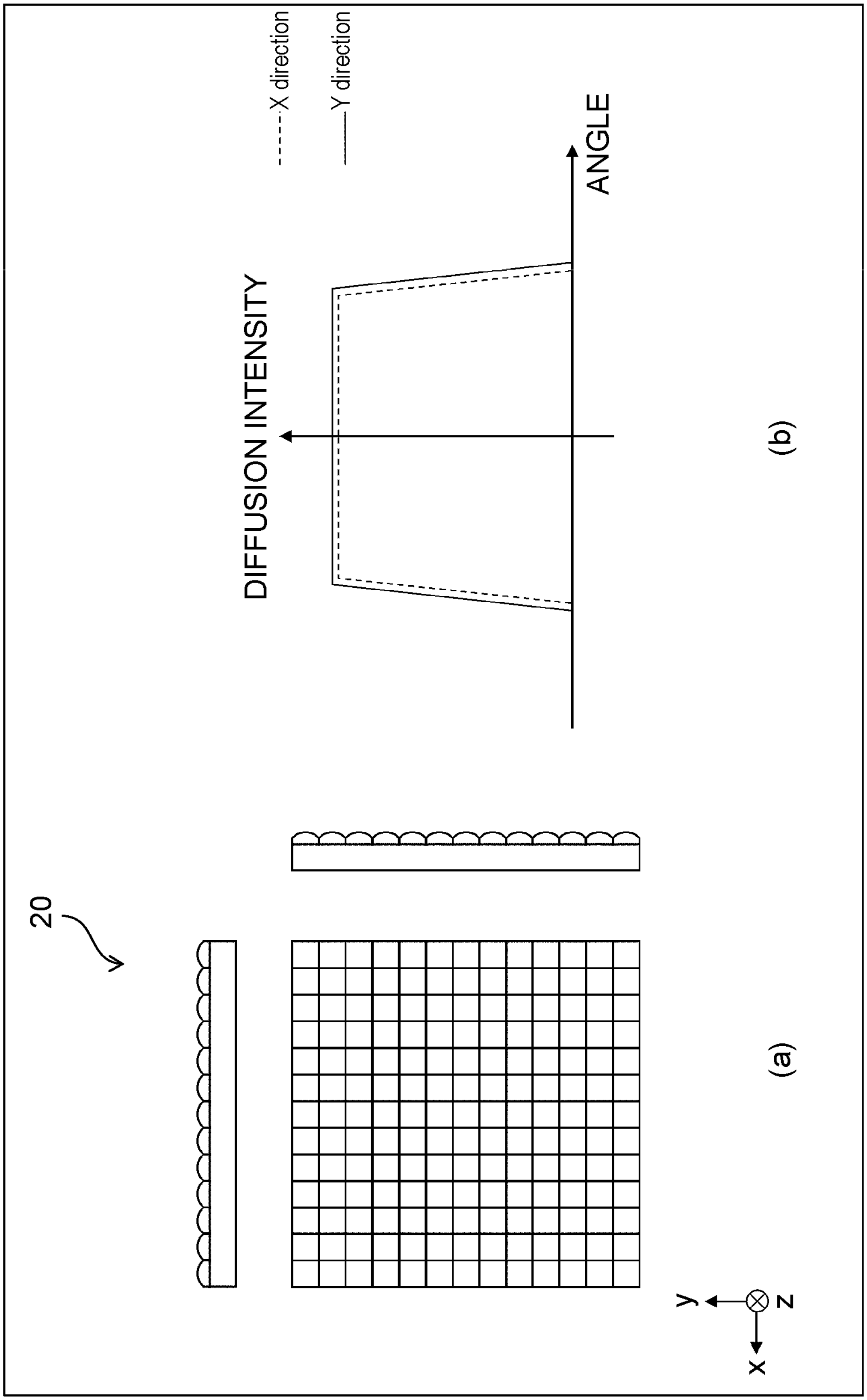
FIG. 6 is a diagram illustrating a shape and diffusion characteristics of diffuser plate 20 according to the first exemplary embodiment.

Hereinafter, the actions of diffuser plate 20 and diffuser plate 21 will be described with reference to FIGS. 6 to 10B. Part (a) of FIG. 6 is a diagram illustrating a shape of diffuser plate 20. Diffuser plate 20 has a shape in which one surface is a flat surface and square microlenses are arrayed in a square shape on the other surface. Diffuser plate 20 has a square shape in which the microlenses have the same size in the x direction and the y direction.

Part (b) of FIG. 6 is a diagram illustrating diffusion angle characteristics of diffuser plate 20. Diffuser plate 20 has isotropic characteristics in which light transmitted through diffuser plate 20 is diffused in a top-hat type in the x direction and the y direction perpendicular to the x direction and is diffused at a substantially identical angle in the x direction and the y direction. Here, the x direction is an example of a first direction, and the y direction is an example of a second direction. Note that, diffuser plate 20 may have another shape having similar diffusion characteristics, or may have a shape in which microlenses are randomly arrayed in order to reduce coherence. Diffuser plate 20 may have Gaussian diffusion characteristics instead of top-hat diffusion characteristics. Although details will be described later, it is preferable that the diffusion angle be increased as much as possible to such an extent that light incident on rod integrator 30 is not lost.

Figure 7:
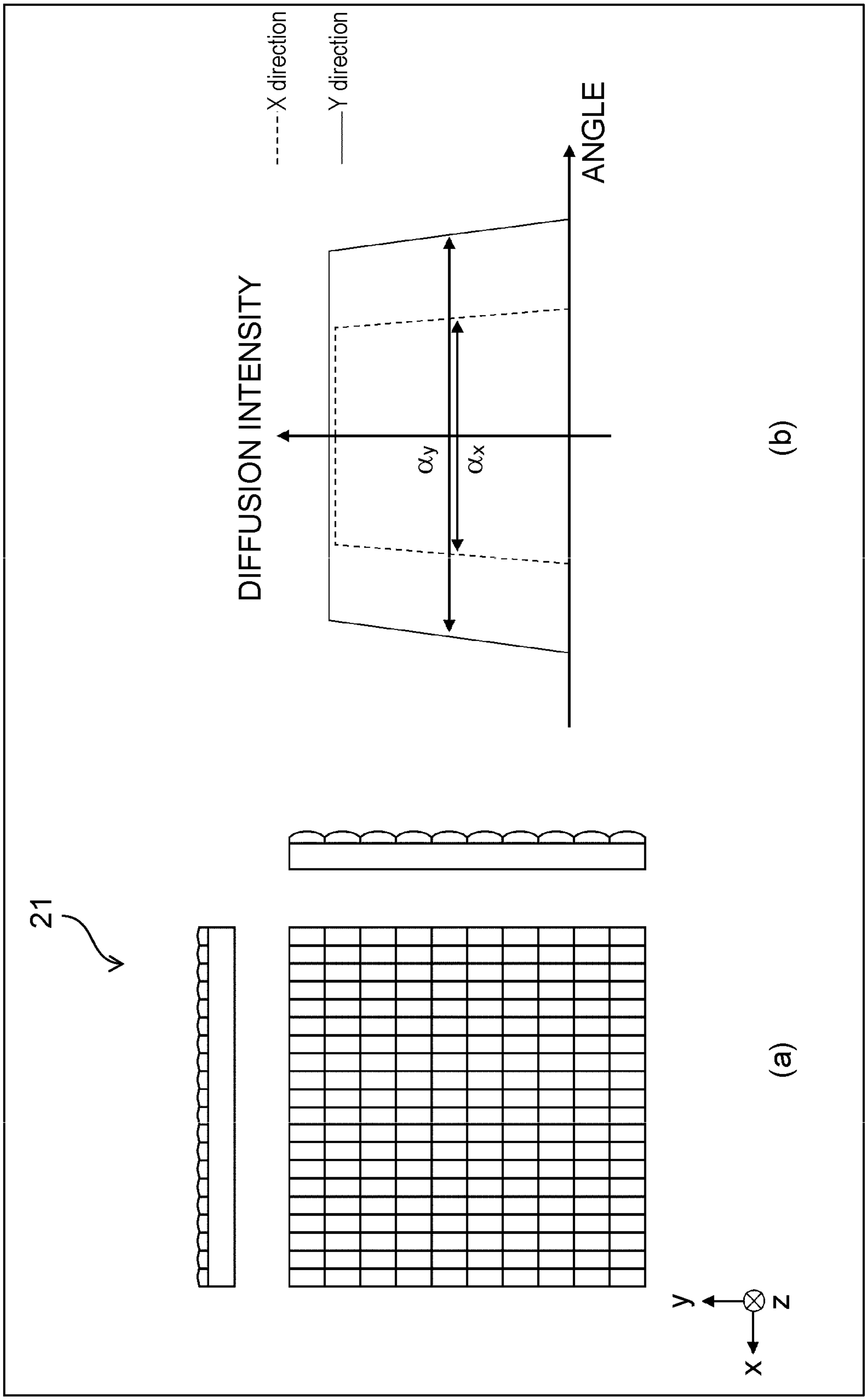
FIG. 7 is a diagram illustrating a shape and diffusion characteristics of diffuser plate 21 according to the first exemplary embodiment.

Part (a) of FIG. 7 is a diagram illustrating a shape of diffuser plate 21. Diffuser plate 21 has a shape in which one surface is a flat surface and rectangular microlenses are arrayed in a square shape on the other surface. Diffuser plate 21 has a rectangular shape in which the microlenses are longer in the y direction than in the x direction.

Part (b) of FIG. 7 is a diagram illustrating diffusion angle characteristics of diffuser plate 21. Diffuser plate 21 has anisotropic characteristics in which light transmitted through diffuser plate 21 is diffused in a top-hat type in the x direction and the y direction perpendicular to the x direction and is diffused at a larger angle in the y direction than in the x direction. Assuming that a diffusion angle (FWHM: Full Width at Half Maximum) in the x direction is diffusion angle $\alpha_x$, and a diffusion angle (FWHM) in the y direction is diffusion angle $\alpha_y$, $\alpha_x<\alpha_y$ is satisfied. Note that, diffuser plate 21 may have another shape having similar diffusion characteristics, or may have a shape in which the microlenses are randomly arrayed in order to reduce coherence. Diffuser plate 21 may have Gaussian diffusion characteristics instead of top-hat diffusion characteristics. Diffuser plate 21 may be a cylindrical lens array that diffuses only in the y direction.

Figure 8A:
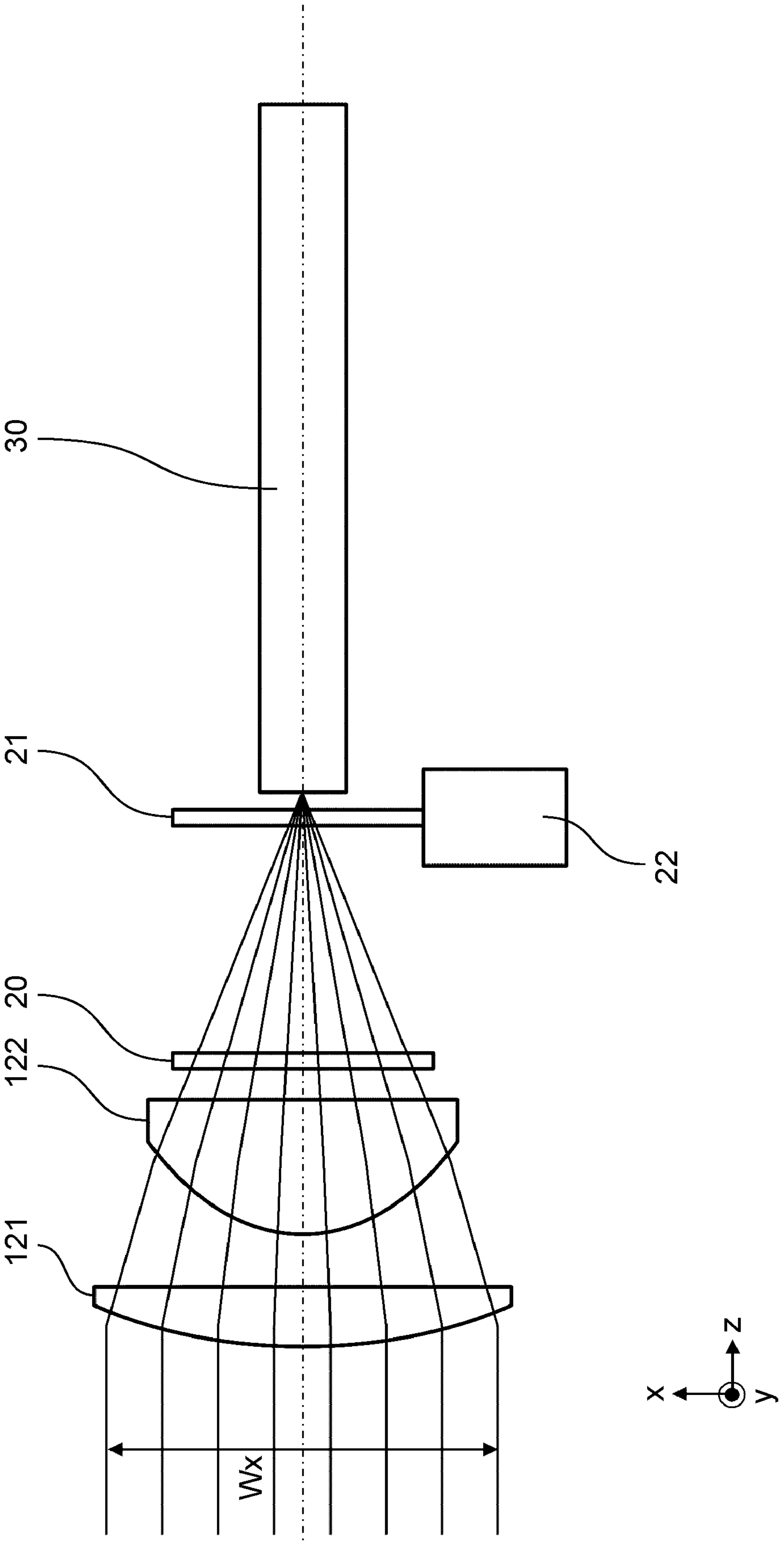
FIG. 8A is a top view illustrating a scene of a light ray according to the first exemplary embodiment.

FIG. 8A is a top view (x-z cross-sectional view) illustrating a scene of a light ray in which the light emitted from light source device 10 enters rod integrator 30. However, here, only a refraction action of the lens is illustrated, and a scene of the diffusion by diffuser plate 20 and diffuser plate 21 is not illustrated. In the top view (x-z cross-sectional view), lens 121 and lens 122 concentrate substantially collimated light having light flux width Wx (see FIG. 4) emitted from light source device 10, and concentrate the substantially collimated light near the incident surface of rod integrator 30.

Figure 8B:
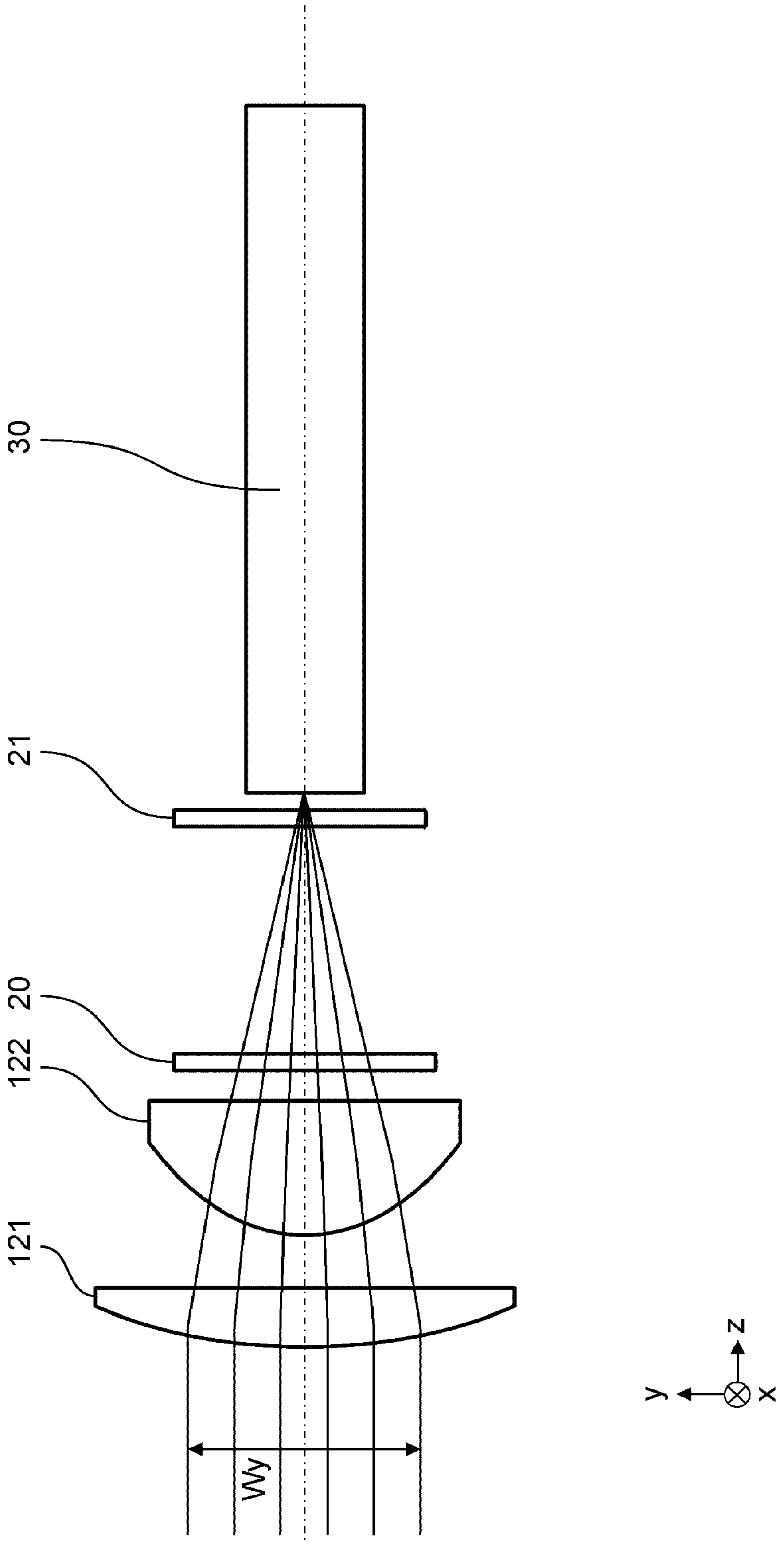
FIG. 8B is a side view illustrating the scene of the light ray according to the first exemplary embodiment.

FIG. 8B is a side view (y-z cross-sectional view) illustrating the scene of the light ray in which the light emitted from light source device 10 enters rod integrator 30. However, here, only a refraction action of the lens is illustrated, and a scene of the diffusion by diffuser plate 20 and diffuser plate 21 is not illustrated. In the side view (y-z cross-sectional view), lens 121 and lens 122 concentrate substantially collimated light having light flux width Wy (see FIG. 4) emitted from light source device 10, and concentrate the substantially collimated light near the incident surface of rod integrator 30.

Figure 9A:
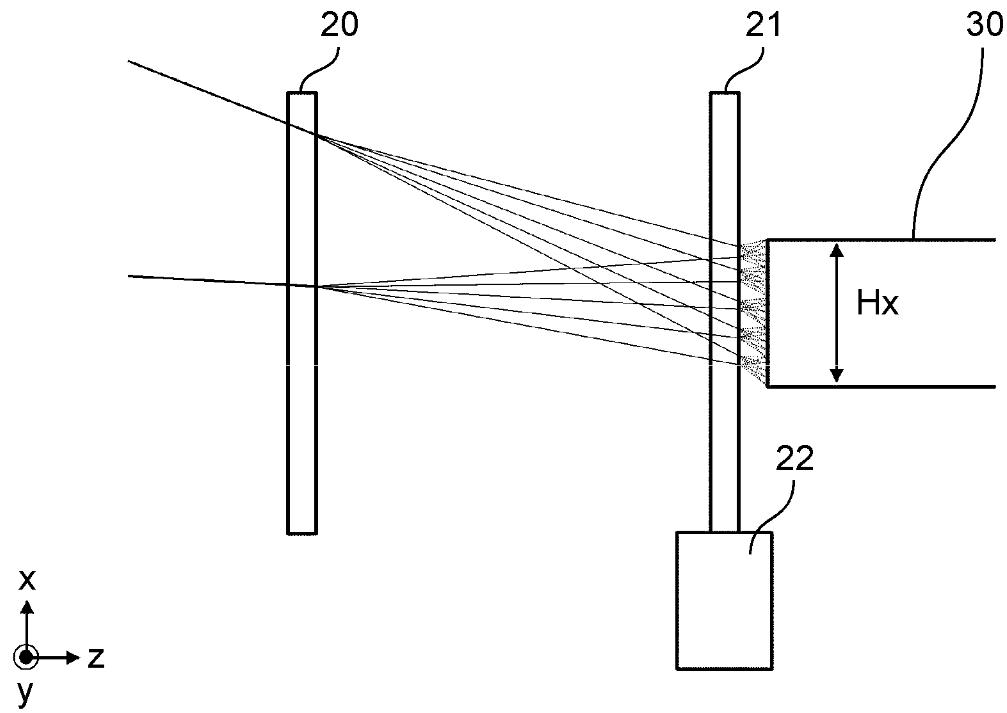
FIG. 9A is a top view illustrating a scene of diffusion by the diffuser plate according to the first exemplary embodiment.

FIG. 9A is a top view (x-z cross-sectional view) illustrating a scene of the diffusion of the light rays by diffuser plate 20 and diffuser plate 21. For the sake of simplicity, only a light ray on an outermost peripheral side and a light ray near a center are illustrated as the light ray incident on diffuser plate 20. Diffuser plate 20 diffuses an incident light ray on a diffusion surface (a surface on an emission side of diffuser plate 20). The light diffused by diffuser plate 20 spreads as the light advances in a z direction, and illuminates diffuser plate 21 with a wide area to a certain extent. Diffuser plate 21 further diffuses the light diffused by diffuser plate 20 on a diffusion surface (a surface on an emission side of diffuser plate 21). Specifically, the light ray incident on diffuser plate 21 at an angle formed by the optical axis in the x direction and diffusion angle component el (first diffusion angle component) is diffused by diffuser plate 21 by being further given diffusion angle $\Delta\Theta 1$ (first diffusion angle, $\Delta\Theta 1=\alpha_x/2$) in the x direction. The light diffused by diffuser plate 21 is incident on rod integrator 30. Since a light density is relaxed by diffuser plate 20 without concentrating the light at one point near the incident surfaces of diffuser plate 21 and rod integrator 30, damage to diffuser plate 21 and rod integrator 30 can be prevented. Since diffuser plate 20 illuminates a wide region of diffuser plate 21, a light uniformizing effect can be enhanced, and uniformity of projection light and speckle noise reduction can be achieved. It is preferable that a degree of diffusion by diffuser plate 20 be increased as much as possible to an extent that the incident light is not lost with respect to width Hx in the x direction of rod integrator 30.

Figure 9B:
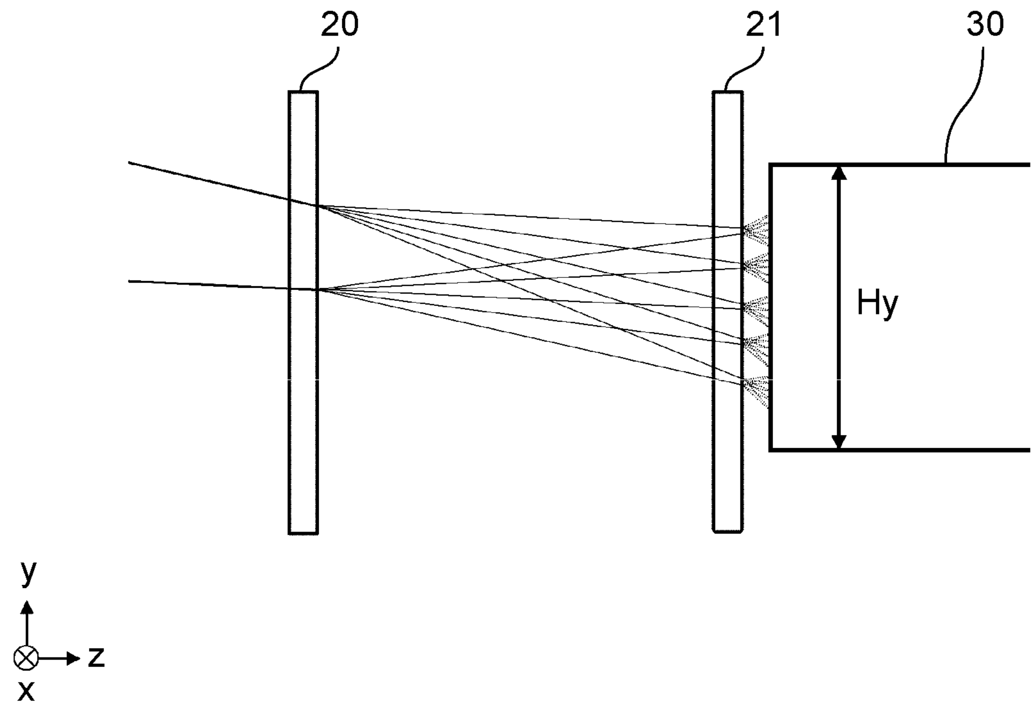
FIG. 9B is a side view illustrating the scene of the diffusion by the diffuser plate according to the first exemplary embodiment.

FIG. 9B is a side view (y-z cross-sectional view) illustrating the scene of the diffusion of the light rays by diffuser plate 20 and diffuser plate 21. For the sake of simplicity, only a light ray on an outermost peripheral side and a light ray near a center are illustrated as the light ray incident on diffuser plate 20. Diffuser plate 20 diffuses a light ray to be incident on a diffusion surface (a surface on an emission side of diffuser plate 20). The light diffused by diffuser plate 20 spreads as the light advances in a z direction, and illuminates diffuser plate 21 with a wide area to a certain extent. Diffuser plate 21 further diffuses the light diffused by diffuser plate 20 on a diffusion surface (a surface on an emission side of diffuser plate 21). Specifically, the light ray incident on diffuser plate 21 at an angle formed by the optical axis in the y direction and diffusion angle component Θ2 (second diffusion angle component) is diffused by diffuser plate 21 by being further given diffusion angle $\Delta\Theta 2$ (second diffusion angle, $\Delta\Theta 2=\alpha_y/2$) in the y direction. The light diffused by diffuser plate 21 is incident on rod integrator 30. Since a light density is relaxed by diffuser plate 20 without concentrating the light at one point near the incident surfaces of diffuser plate 21 and rod integrator 30, damage to diffuser plate 21 and rod integrator 30 can be prevented. Since diffuser plate 20 illuminates a wide region of diffuser plate 21, a light uniformizing effect can be enhanced, and uniformity of projection light and speckle noise reduction can be achieved. It is preferable that a degree of diffusion by diffuser plate 20 be increased as much as possible to an extent that the incident light is not lost with respect to width Hy in the y direction of rod integrator 30.

Movement mechanism 22 is a mechanism that vibrates diffuser plate 21 in the x direction at a constant cycle. Movement mechanism 22 vibrates diffuser plate 21, and thus, coherence can be reduced. Note that, the movement of diffuser plate 21 may be performed such that diffuser plate 21 does not move in a rotation direction, and may be vibration in the y direction or swing movement. Note that, diffuser plate 20 may be vibrated at a constant cycle by the movement mechanism. In this case, since the diffusion characteristics of diffuser plate 20 are isotropic, the vibration movement in the rotation direction may be used. Coherence can be further reduced by vibrating diffuser plate 20. An arrangement location of diffuser plate 20 is not limited to between lens 122 and diffuser plate 21 illustrated in FIG. 1, and may be between lens 121 and lens 122, or may be between light source device 10 and lens 121 as long as the arrangement location is between light source device 10 (solid-state light source array) and diffuser plate 21.

Figure 10A:
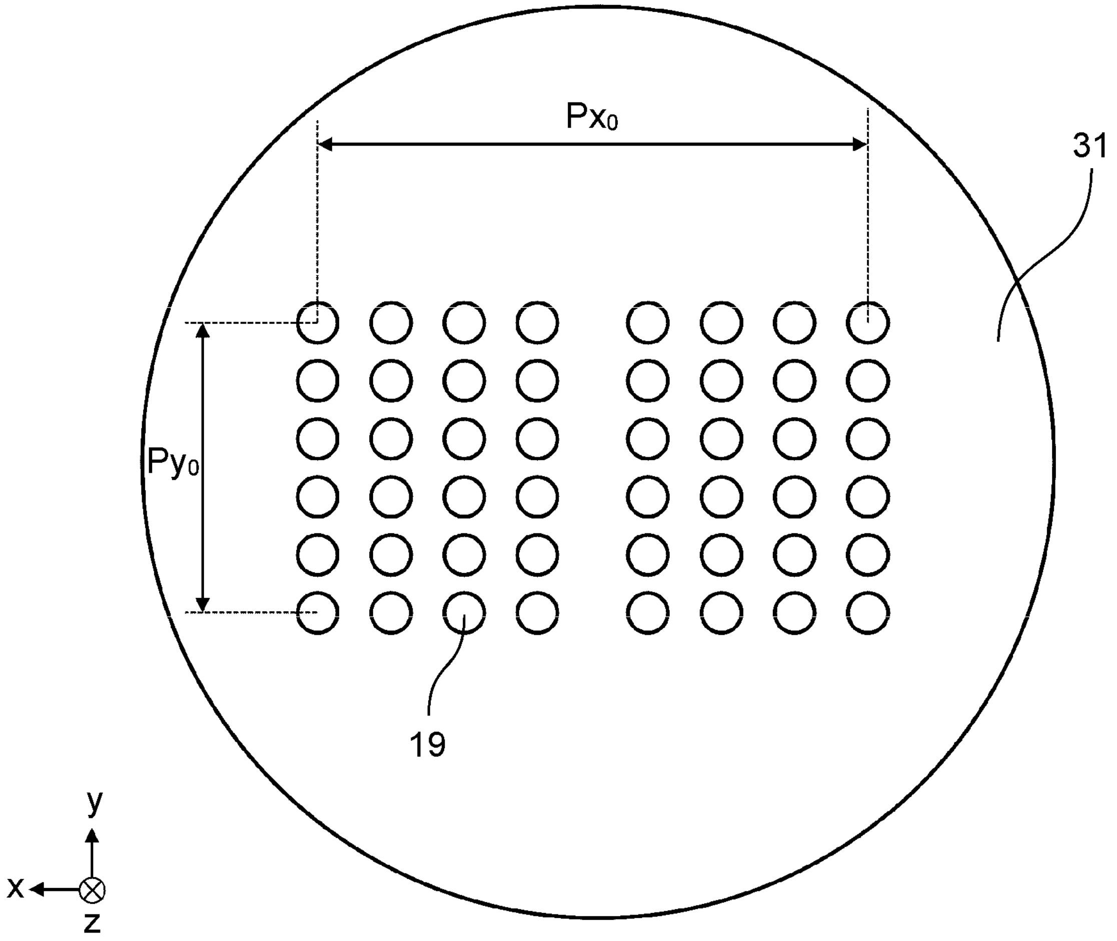
FIG. 10A is a diagram illustrating an angle distribution of light incident on rod integrator 30 in a comparative example of the first exemplary embodiment.

FIG. 10A is a schematic diagram illustrating an angle distribution of light incident on rod integrator 30 when diffuser plate 21 is not provided as a comparative example. Since the light emitted from light source device 10 is concentrated by lens 121 and lens 122, the angle distribution of FIG. 10A is substantially similar to the light flux distribution emitted from light source device 10 illustrated in FIG. 4. That is, a ratio between light flux width Wx and light flux width Wy in FIG. 4 and a ratio between angle distribution width $Px_0$ in the x direction and angle distribution width $Py_0$ in the y direction in FIG. 10A are substantially equal ($Wx:Wy \approx Px_0:Py_0$), and thus, angle distribution width $Px_0$ in the x direction is larger than angle distribution width $Py_0$ in the y direction ($Px_0>Py_0$). In FIG. 10A, the distribution of images 19 of the emitters has more tolerance with respect to maximum allowable incident angle 31 to rod integrator 30 in the y direction than the x direction.

Figure 10B:
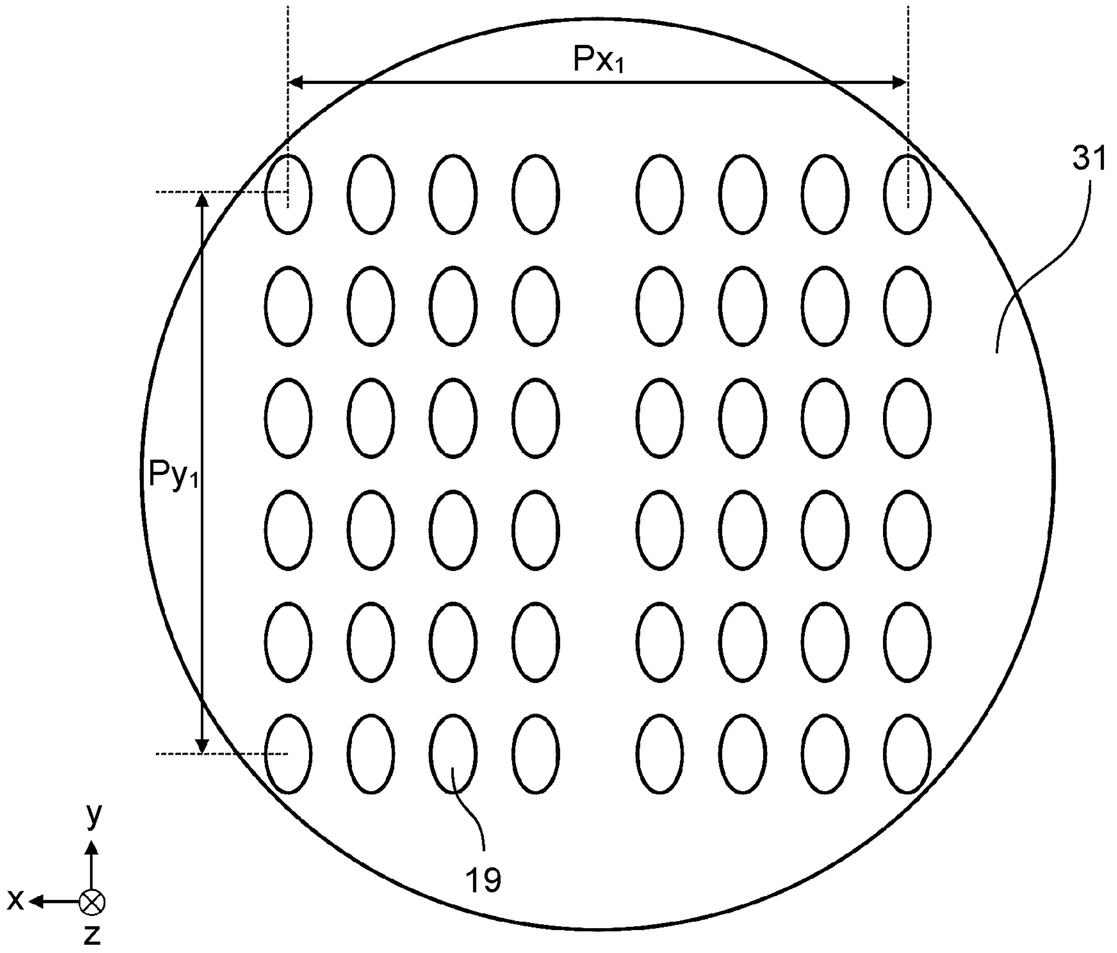
FIG. 10B is a diagram illustrating an angle distribution of light incident on rod integrator 30 according to the first exemplary embodiment.

FIG. 10B is a schematic diagram illustrating an angle distribution of light incident on rod integrator 30 when diffuser plate 21 is provided (first exemplary embodiment). In the first exemplary embodiment, since diffuser plate 21 has characteristics that the light is strongly diffused in the y direction rather than the x direction, FIG. 10B has an angle distribution in which the angle distribution in FIG. 10A is extended in the y direction, and angle distribution width $Px_1$ in the x direction and angle distribution width $Py_1$ in the y direction are substantially identical ($Px_1 \approx Py_1$). Accordingly, in the first exemplary embodiment, the angle distribution of the incident light is distributed (that is, an aspect ratio of the angle distribution of the incident light is approximately 1) in the same range in the x direction and the y direction with respect to maximum allowable incident angle 31 to rod integrator 30, and the angle distribution is expanded to the utmost extent. At this time, the diffusion characteristics of diffuser plate 21 are characteristics that a difference between the components (diffusion angle components) in the x direction and the y direction at the incident angle of the incident light on diffuser plate 21 is corrected such that the aspect ratio of the angle distribution formed by images 19 of the emitters becomes approximately 1 by an anisotropic diffusion angle. That is, the sum of the angle (diffusion angle component $\Theta1$) of the incident light with respect to the optical axis in the x direction and diffusion angle $\Delta\Theta1$ is substantially equal to the sum of the angle (diffusion angle component $\Theta2$) of the incident light with respect to the optical axis in the y direction and diffusion angle $\Delta\Theta2$ ($\Theta1+\Delta\Theta1 \approx \Theta2+\Delta\Theta2$). Image 19 of each emitter appearing on the angle distribution illustrated in FIG. 10B has an elliptical shape that is greatly extended in the y direction rather than the x direction.

Meanwhile, as a method for effectively suppressing speckle noise in a projection display apparatus using a laser light source having high coherence, there is a method for multiplexing angles of light rays incident on one point of a screen by angle superimposition. Specifically, in an exit pupil of projection unit 50, it is preferable that a pupil diameter be increased and a light intensity distribution be flattened on the pupil. The light intensity distribution on the exit pupil of projection unit 50 and the angle distribution of the incident light on rod integrator 30 have a correlation. Accordingly, although FIGS. 10A and 10B have been described as the angle distribution of the light incident on rod integrator 30, the angle distribution can be simultaneously read as the light intensity distribution on the exit pupil of projection unit 50, and a circle indicated by maximum allowable incident angle 31 can be read as an exit pupil diameter of projection unit 50.

As described above, in the first exemplary embodiment, since the light intensity distribution is as close as possible to a size of the exit pupil diameter in the exit pupil of projection unit 50 as illustrated in FIG. 10B, the speckle noise can be effectively reduced by the effect of the angle superimposition as described above, and a light loss can also be reduced since the light intensity distribution falls within the exit pupil diameter.

Actions and Effects

When the light intensity distribution of the light flux emitted from light source device 10 is longer in the x direction than in the y direction, the aspect ratio of the angle distribution of the light incident on rod integrator 30 is set to approximately 1 by diffuser plate 21 that diffuses more strongly in the y direction than in the x direction, and the light intensity distribution is expanded near the maximum allowable incident angle. Thus, the light loss is small, and the speckle noise can be effectively reduced.

Second Exemplary Embodiment

Hereinafter, a second exemplary embodiment will be described with reference to FIGS. 11 to 18B. Hereinafter, differences from the first exemplary embodiment will be mainly described. Since the other points are similar to the points of the first exemplary embodiment, the identical components are denoted by the same reference marks, and redundant description will be omitted.

(Projection Display Apparatus)

Figure 11:
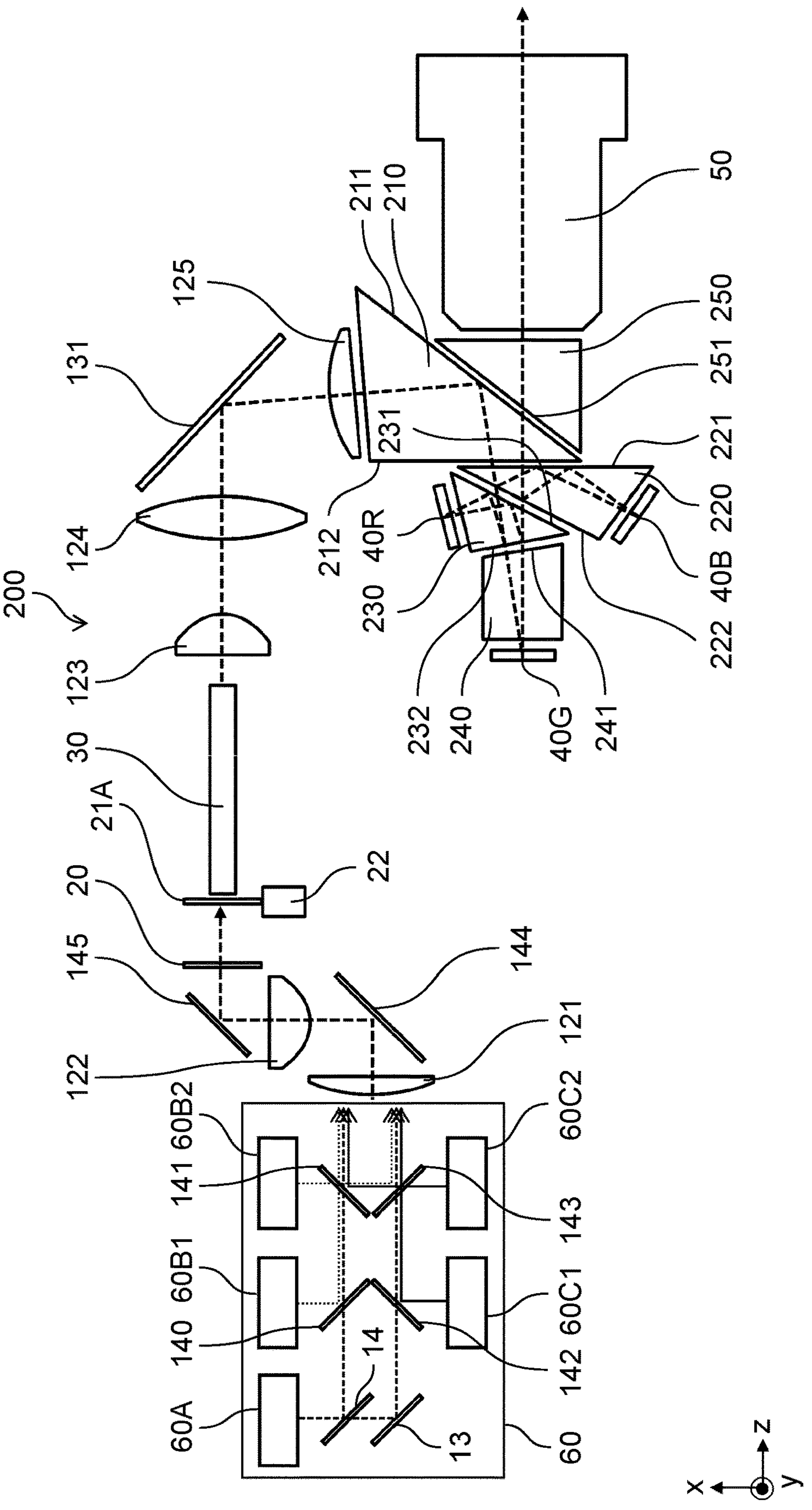
FIG. 11 is a diagram illustrating a projection display apparatus according to a second exemplary embodiment.

Hereinafter, a configuration of a projection display apparatus according to the second exemplary embodiment will be described with reference to FIG. 11. FIG. 11 is a diagram illustrating an optical configuration of projection display apparatus 200 according to the second exemplary embodiment. As illustrated in FIG. 11, as the differences from the first exemplary embodiment, projection display apparatus 200 includes light source device 60 including first solid-state light source array 60A, second solid-state light source array 60B1, second solid-state light source array 60B2, third solid-state light source array 60C1, and third solid-state light source array 60C2, and mirror 144 and mirror 145 for bending an optical path are arranged in an optical system from lens 121 to rod integrator 30.

(Light Source Device)

Figure 12:
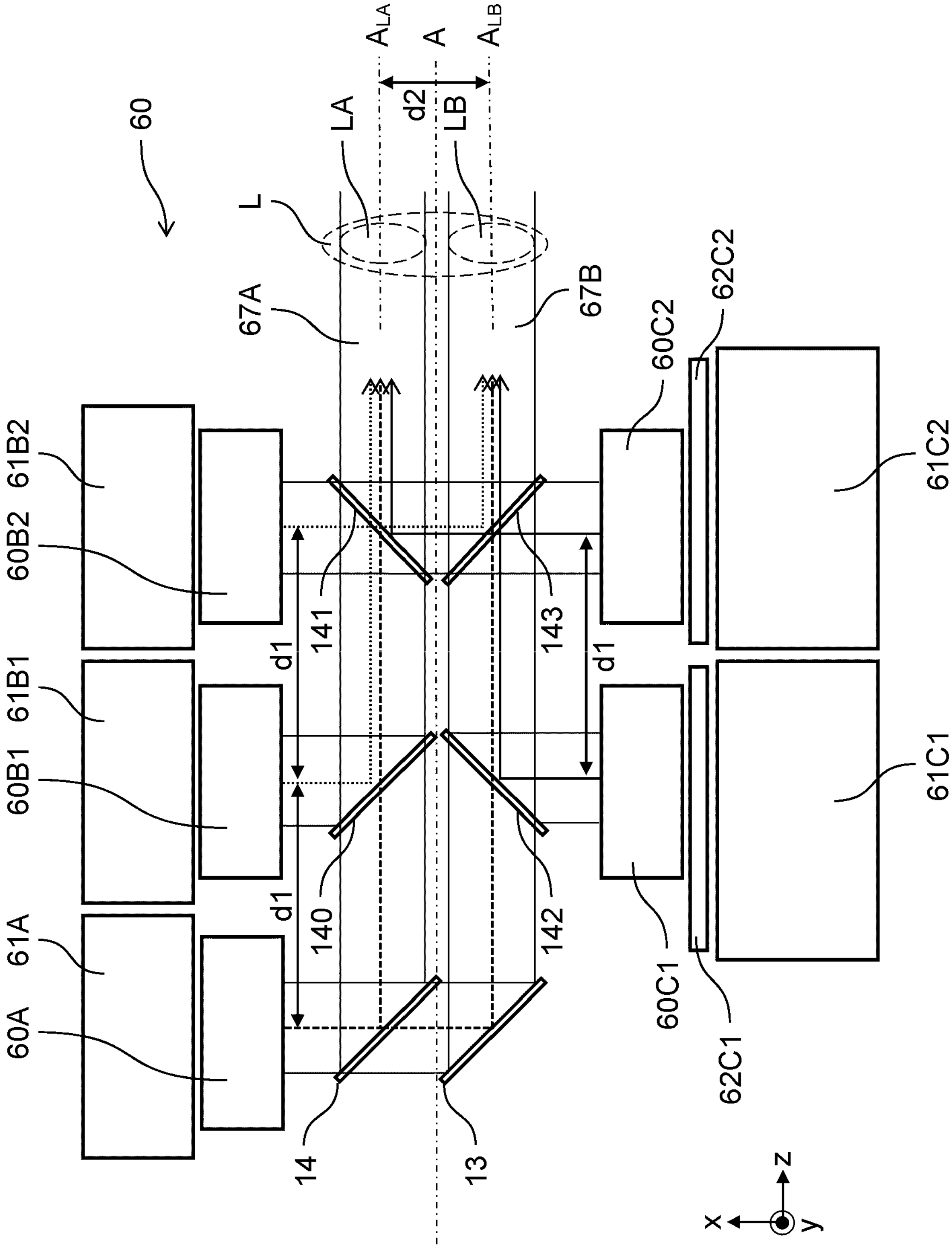
FIG. 12 is a diagram illustrating a light source device according to the second exemplary embodiment.

Hereinafter, a light source device according to the second exemplary embodiment will be described with reference to FIGS. 12 to 14. FIG. 12 is a diagram illustrating light source device 60 according to the second exemplary embodiment.

In the second exemplary embodiment, light source device 60 used in the projection display apparatus illustrated in FIG. 11 mainly includes first solid-state light source array 60A, second solid-state light source arrays 60B1, 60B2, third solid-state light source arrays 60C1, 60C2, half mirror 14, mirror 13, and dichroic mirrors 140 to 143.

With optical axis A of light flux L emitted from a light synthesizing unit including half mirror 14, mirror 13, and dichroic mirrors 140 to 143 as a boundary, third solid-state light source array 60C1 and third solid-state light source array 60C2 are arranged at center interval d1 on one side, and first solid-state light source array 60A and second solid-state light source array 60B1, and second solid-state light source array 60B1 and second solid-state light source array 60B2 are arranged at center interval d1 on the other side.

A light flux reflected by half mirror 14, of blue light emitted from first solid-state light source array 60A, green light emitted from second solid-state light source array 60B1, and red light emitted from third solid-state light source array 60C2 are synthesized by dichroic mirror 140 and dichroic mirror 141 to form light flux LA of white light, and travel through first optical path 67A.

A light flux transmitted through half mirror 14 and reflected by mirror 13, of blue light emitted from first solid-state light source array 60A, green light emitted from second solid-state light source array 60B2, and red light emitted from third solid-state light source array 60C1 are synthesized by dichroic mirror 142 that reflects the red light and transmits the blue light and dichroic mirror 143 that reflects the green light and transmits the blue light and the red light to form light flux LB of white light, and travel through second optical path 67B.

At this time, assuming that an interval between optical axis $A_{LA}$ of light flux LA and optical axis $A_{LB}$ of light flux LB is center interval d2, positions of half mirror 14, mirror 13, and dichroic mirrors 140 to 143 are adjusted and arranged such that d1>d2 is satisfied. As a result, center interval d2 between light flux LA traveling through first optical path 67A and light flux LB traveling through second optical path 67B is narrower than center interval d1 of the color light emitted from the solid-state light source array (second solid-state light source arrays 60B1, 60B2 or third solid-state light source arrays 60C1, 60C2) arranged adjacent to each other. Note that, in the present exemplary embodiment, center interval d1 between the solid-state light source arrays has a common value, but can be appropriately adjusted.

Light source device 60 includes a necessary cooling mechanism group. The cooling mechanism group includes cooling mechanism 61A provided side by side with first solid-state light source array 60A, cooling mechanism 61B1 provided side by side with second solid-state light source array 60B1, cooling mechanism 61B2 provided side by side with second solid-state light source array 60B2, cooling mechanism 61C1 provided side by side with third solid-state light source array 60C1, and cooling mechanism 61C2 provided side by side with third solid-state light source array 60C2.

Cooling mechanism 61A, cooling mechanism 61B1, and cooling mechanism 61B2 are cooling mechanisms for respectively cooling first solid-state light source array 60A, second solid-state light source array 60B1, and second solid-state light source array 60B2 available used under a high-temperature condition where a case temperature of the laser ranges from 50° C. to 70° C. inclusive. Here, the fact that the solid-state light source array is available under the high-temperature condition where the case temperature of the laser ranges from 50° C. to 70° C. inclusive means that the case temperature of the laser of each solid-state light source array is set to the range from 50° C. to 70° C. inclusive as a target cooling temperature of first solid-state light source array 60A, second solid-state light source array 60B1, and second solid-state light source array 60B2.

On the other hand, cooling mechanism 61C1 and cooling mechanism 61C2 are cooling mechanisms for respectively cooling third solid-state light source array 60C1 and third solid-state light source array 60C2 that need to be used under a low-temperature condition where the case temperature of the laser ranges from 20° C. to 40° C. inclusive, and are provided side by side with third solid-state light source array 60C1 and third solid-state light source array 60C2 with Peltier element 62C1 and Peltier element 62C2 interposed therebetween, respectively. Here, the fact that the solid-state light source arrays need to be used under the low-temperature condition where the case temperature of the laser ranges from 20° C. to 40° C. inclusive means that the laser case temperature of each solid-state light source array is set to the range from 20° C. to 40° C. inclusive as a target cooling temperature of third solid-state light source array 60C1 and third solid-state light source array 60C2. Thus, in the present exemplary embodiment, third solid-state light source array 60C1 and third solid-state light source array 60C2 are light source arrays that need to be used under a lowest target cooling temperature among the first to third solid-state light source arrays. The cooling mechanism group is bonded to a back surface of each of the first solid-state light source array, the second solid-state light source array, and the third solid-state light source array provided side by side via, for example, thermally conductive grease or the like. The cooling mechanism group is an example of a cooling device.

Figure 13:
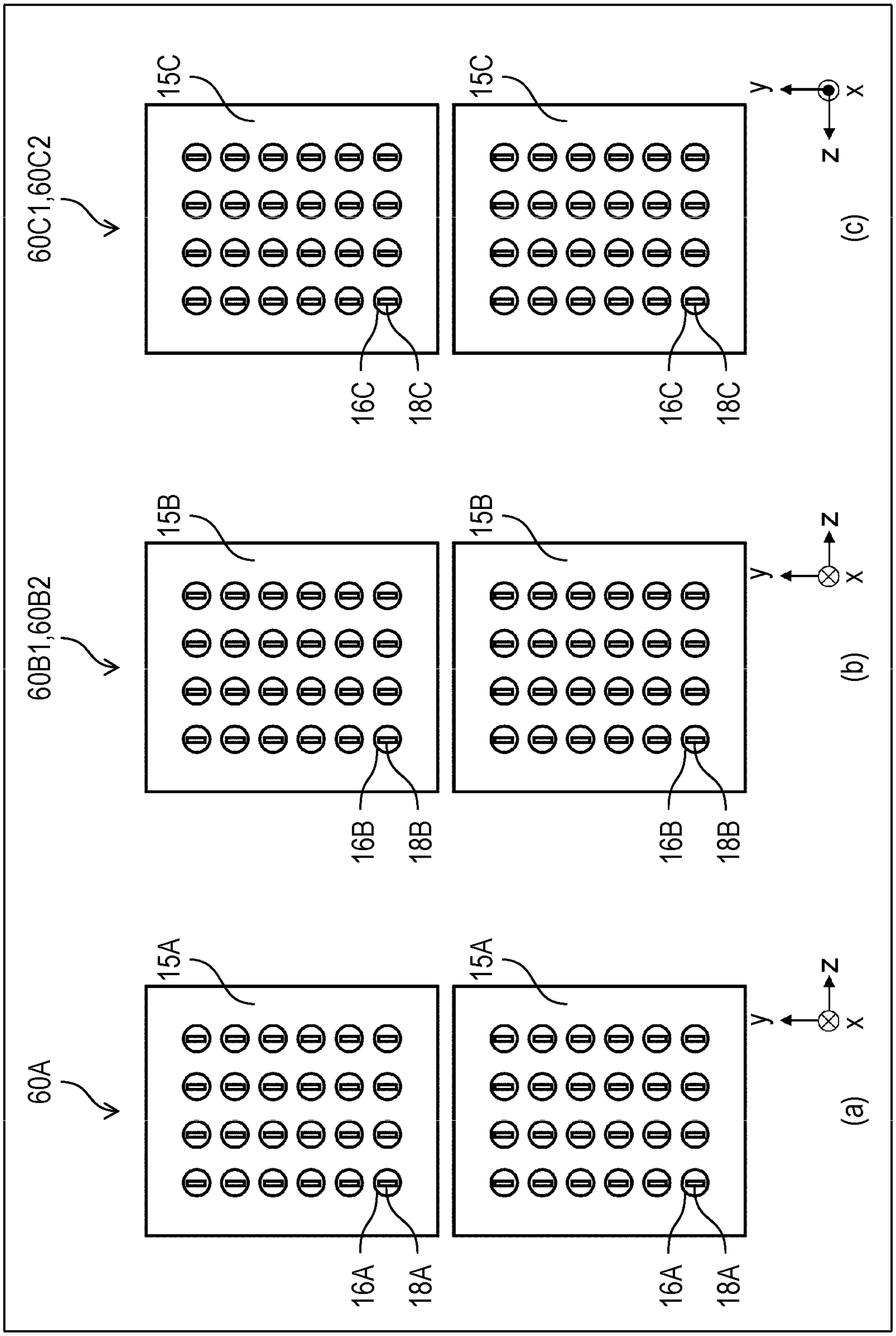
FIG. 13 is a diagram illustrating a solid-state light source array according to the second exemplary embodiment.

Part (a) of FIG. 13 is a diagram of first solid-state light source array 60A as viewed in an +x direction of FIG. 12, part (b) of FIG. 13 is a diagram of second solid-state light source array 60B1 and second solid-state light source array 60B2 as viewed in the +x direction of FIG. 12, and part (c) of FIG. 13 is a diagram of third solid-state light source array 60C1 and third solid-state light source array 60C2 as viewed in an −x direction of FIG. 12.

As the differences from the first exemplary embodiment, in first solid-state light source array 60A, second solid-state light source array 60B1, second solid-state light source array 60B2, third solid-state light source array 60C1, and third solid-state light source array 60C2, four in a horizontal direction and six in a vertical direction, that is, a total of 24 laser diodes 16A, 16B, 16C are arranged, and two units arranged on light source blocks 15A, 15B, 15C are provided side by side in the y direction. The numbers and arrays of laser diodes 16A, 16B, 16C included in the solid-state light source arrays are not limited thereto.

Figure 14:
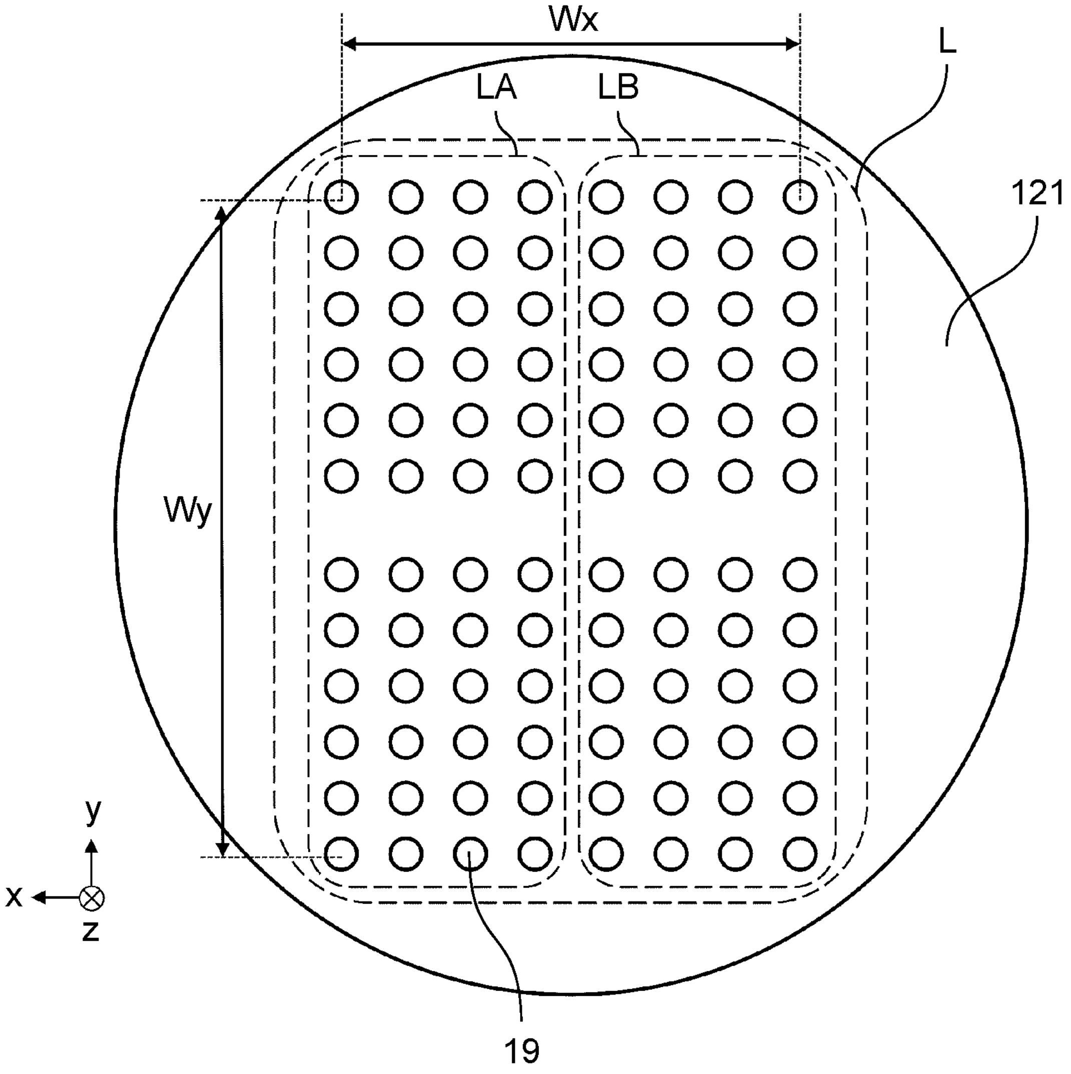
FIG. 14 is a diagram illustrating a light flux distribution after light source device emission according to the second exemplary embodiment.

FIG. 14 is a diagram illustrating the arrangement of light flux L incident on lens 121, and light flux L includes light flux LA traveling through first optical path 67A and light flux LB traveling through second optical path 67B. Light fluxes LA, LB include images 19 of the emitters in parts (a) to (c) of FIG. 13, and image 19 of each emitter is a white image in which blue light (first color light), green light (second color light), and red light (third color light) are synthesized. Assuming that a width in the x direction is light flux width Wx and a width in the y direction is light flux width Wy, light flux L satisfies Wx<Wy. Note that, since the numbers and arrays of laser diodes 16A, 16B, 16C included in the solid-state light source arrays are not limited thereto, images 19 of the emitters can be arranged such that the images of the emitters of blue light, green light, and red light are not superimposed.

Hereinafter, actions of diffuser plate 20 and diffuser plate 21A will be described with reference to FIGS. 15 to 18B.

Figure 15:
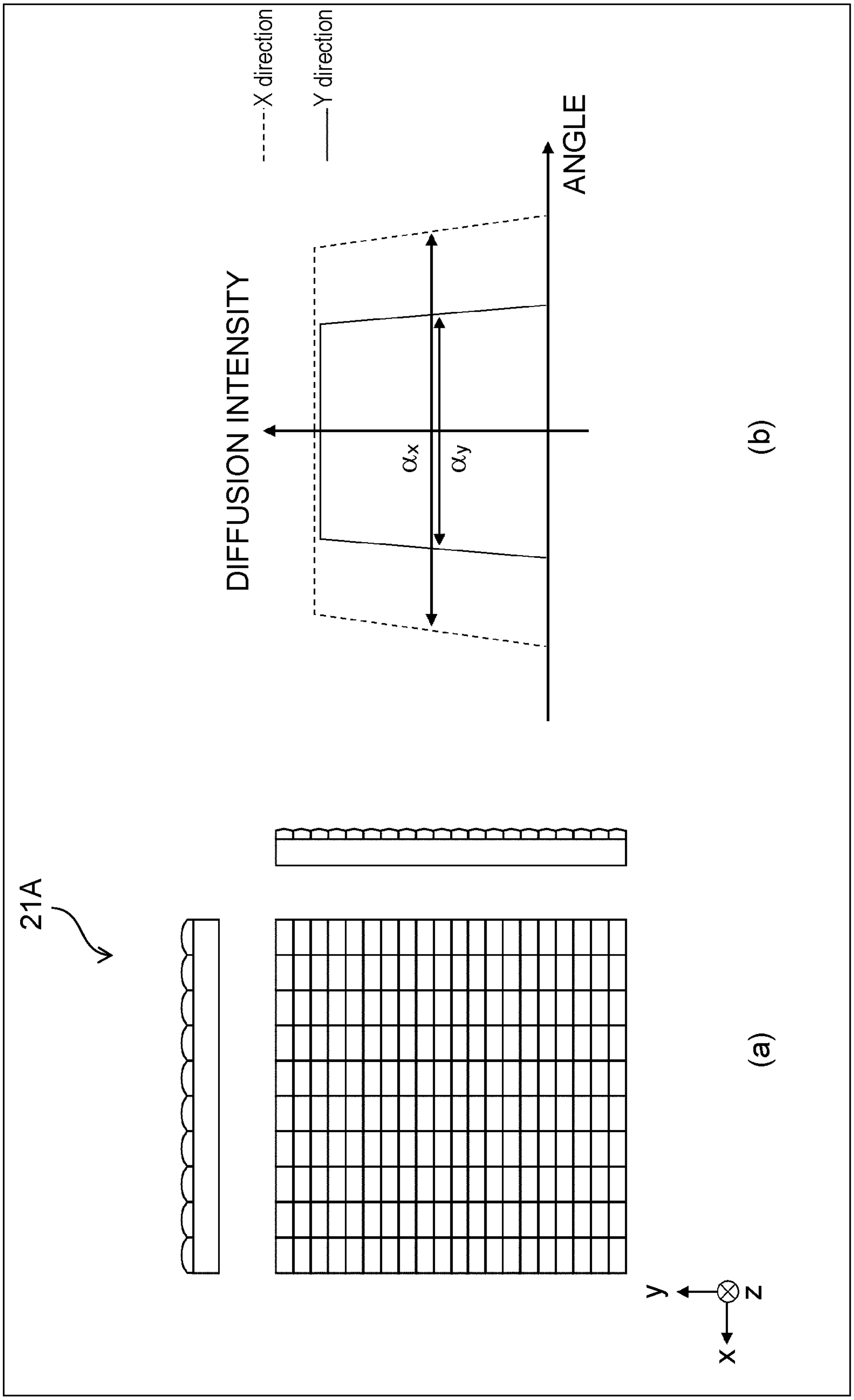
FIG. 15 is a diagram illustrating a shape and diffusion characteristics of diffuser plate 21A according to the second exemplary embodiment.

Part (a) of FIG. 15 is a diagram illustrating a shape of diffuser plate 21A. Diffuser plate 21A has a shape in which one surface is a flat surface and rectangular microlenses are arranged in a square shape on the other surface. Diffuser plate 21A has a rectangular shape in which the microlenses are longer in the x direction than in the y direction. Diffuser plate 21A is an example of a first diffuser plate.

Part (b) of FIG. 15 is a diagram illustrating diffusion angle characteristics of diffuser plate 21A. Diffuser plate 21A has anisotropic characteristics in which light transmitted through diffuser plate 21A is diffused in a top-hat shape in the x direction and the y direction and is diffused at a larger angle in the x direction than in the y direction. Assuming that a diffusion angle (FWHM) in the x direction is diffusion angle $\alpha_x$, and a diffusion angle (FWHM) in the y direction is diffusion angle $\alpha_y$, $\alpha_x>\alpha_y$ is satisfied. Note that, diffuser plate 21A may have another shape having similar diffusion characteristics, or may have a shape in which the microlenses are randomly arrayed in order to reduce coherence. Diffuser plate 21A may have Gaussian diffusion characteristics instead of top-hat diffusion characteristics. Diffuser plate 21A may be a cylindrical lens array that diffuses only in the x direction.

Figure 16A:
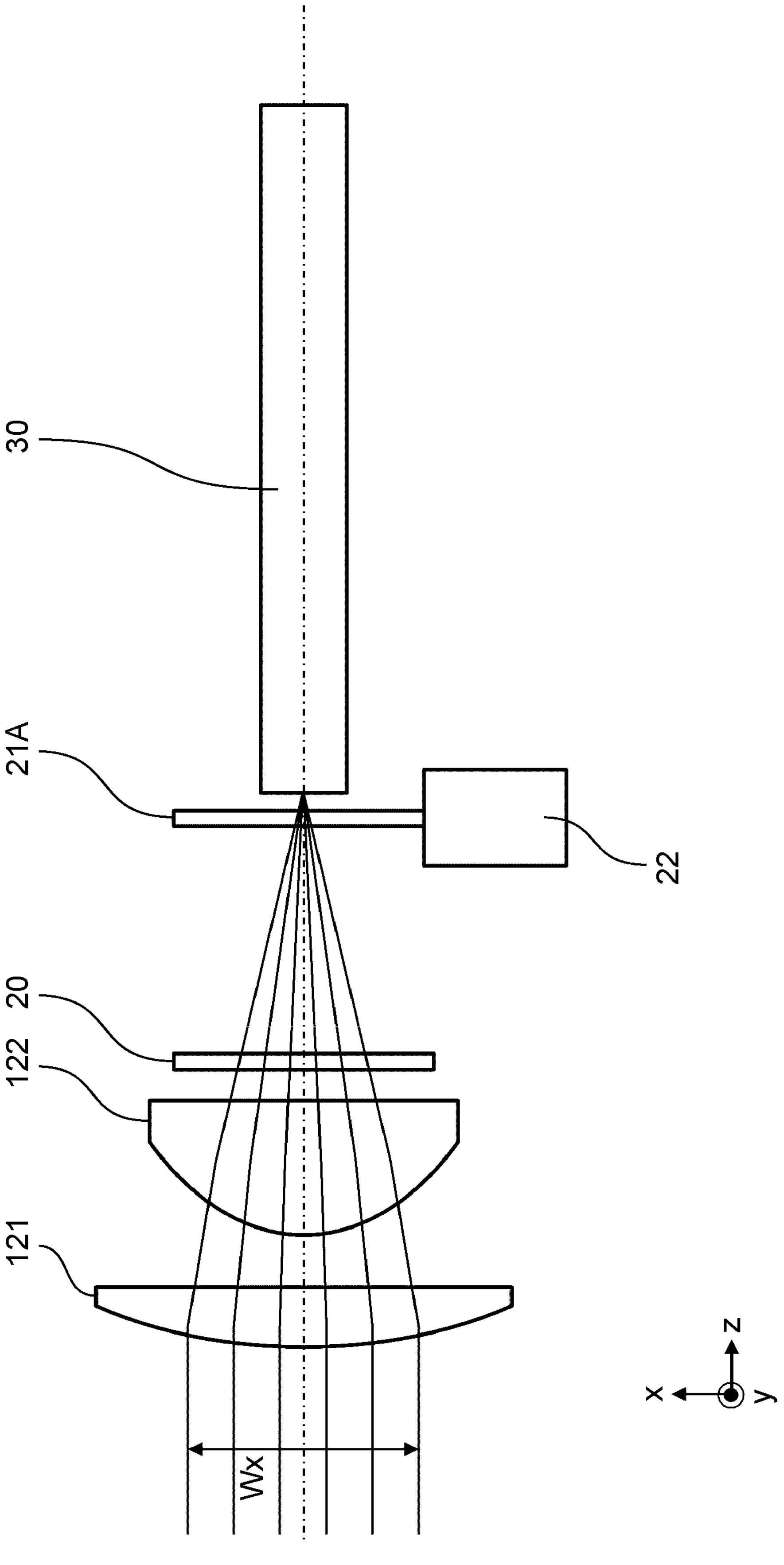
FIG. 16A is a top view illustrating a scene of a light ray according to the second exemplary embodiment.

FIG. 16A is a top view (x-z cross-sectional view) illustrating a scene of a light ray in which the light emitted from light source device 60 enters rod integrator 30. However, here, only a refraction effect of the lens is illustrated, a scene of the diffusion by diffuser plate 20 and diffuser plate 21A is not illustrated, and mirror 144 and mirror 145 are omitted. In the top view (x-z cross-sectional view), lens 121 and lens 122 concentrate substantially collimated light having light flux width Wx (see FIG. 14) emitted from light source device 60, and concentrate the substantially collimated light near the incident surface of rod integrator 30.

Figure 16B:
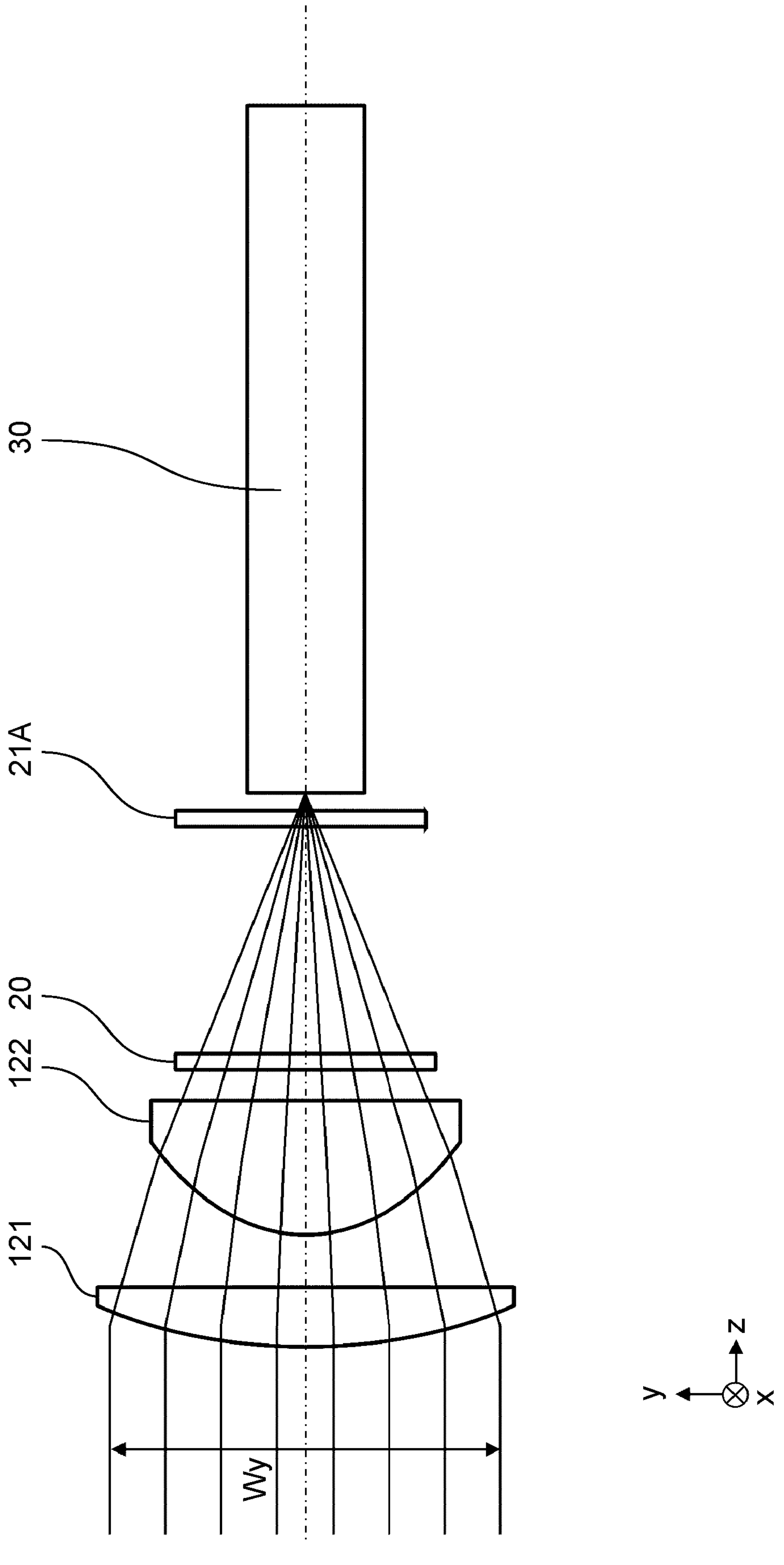
FIG. 16B is a side view illustrating the scene of the light ray according to the second exemplary embodiment.

FIG. 16B is a side view (y-z cross-sectional view) illustrating the scene of the light ray in which the light emitted from light source device 60 enters rod integrator 30. However, here, only a refraction effect of the lens is illustrated, a scene of the diffusion by diffuser plate 20 and diffuser plate 21A is not illustrated, and mirror 144 and mirror 145 are omitted. In the side view (y-z cross-sectional view), lens 121 and lens 122 concentrate substantially collimated light having light flux width Wy (see FIG. 14) emitted from light source device 60, and concentrate the substantially collimated light near the incident surface of rod integrator 30.

Figure 17A:
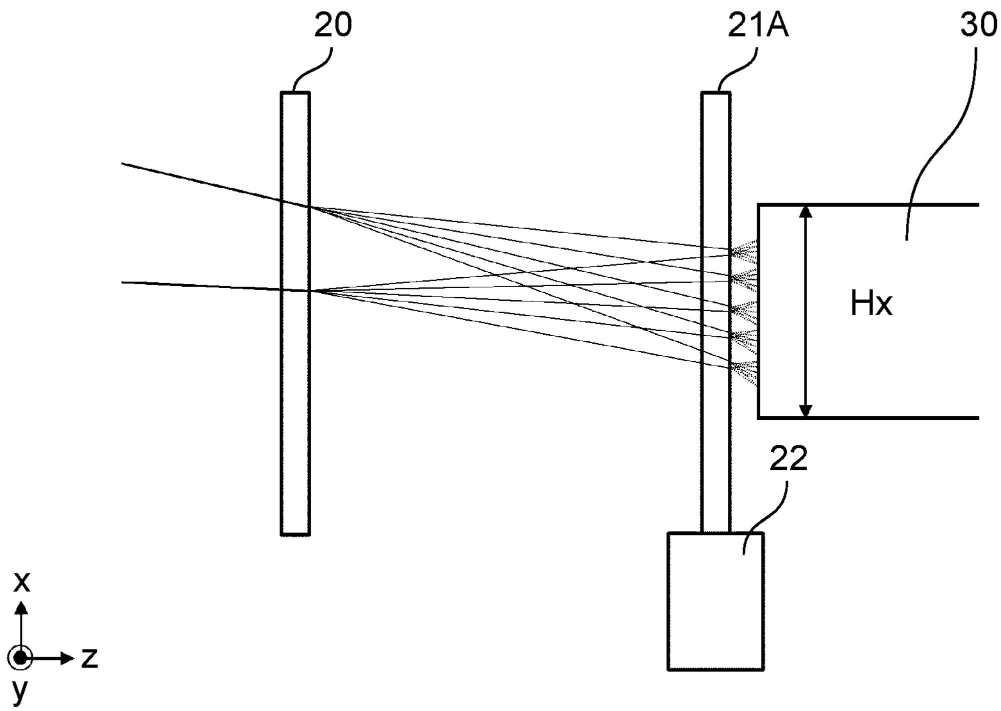
FIG. 17A is a top view illustrating a scene of diffusion by a diffuser plate according to the second exemplary embodiment.

FIG. 17A is a top view (x-z cross-sectional view) illustrating a scene of the diffusion of the light rays by diffuser plate 20 and diffuser plate 21A. For the sake of simplicity, only a light ray on an outermost peripheral side and a light ray near a center are illustrated as the light ray incident on diffuser plate 20. Diffuser plate 20 diffuses a light ray to be incident on a diffusion surface (a surface on an emission side of diffuser plate 20). The light diffused by diffuser plate 20 spreads as the light advances in a z direction, and illuminates diffuser plate 21A with a wide area to a certain extent. Diffuser plate 21A further diffuses the light diffused by diffuser plate 20 on a diffusion surface (a surface on an emission side of diffuser plate 21A). Specifically, the light ray incident on diffuser plate 21A at an angle formed by the optical axis in the x direction and diffusion angle component Θ1 (first diffusion angle component) is diffused by diffuser plate 21A by being further given diffusion angle ΔΘ1 (first diffusion angle, $\Delta\Theta1=\alpha_x/2$) in the x direction. The light diffused by diffuser plate 21 is incident on rod integrator 30. Since a light density is relaxed by diffuser plate 20 without concentrating the light at one point near the incident surfaces of diffuser plate 21A and rod integrator 30, damage to diffuser plate 21A and rod integrator 30 can be prevented. Since diffuser plate 20 illuminates a wide region of diffuser plate 21A, a light uniformizing effect can be enhanced, and uniformity of projection light and speckle noise reduction can be achieved.

It is preferable that a degree of diffusion by diffuser plate 20 be increased as much as possible to an extent that the incident light is not lost with respect to width Hx in the x direction of rod integrator 30.

Figure 17B:
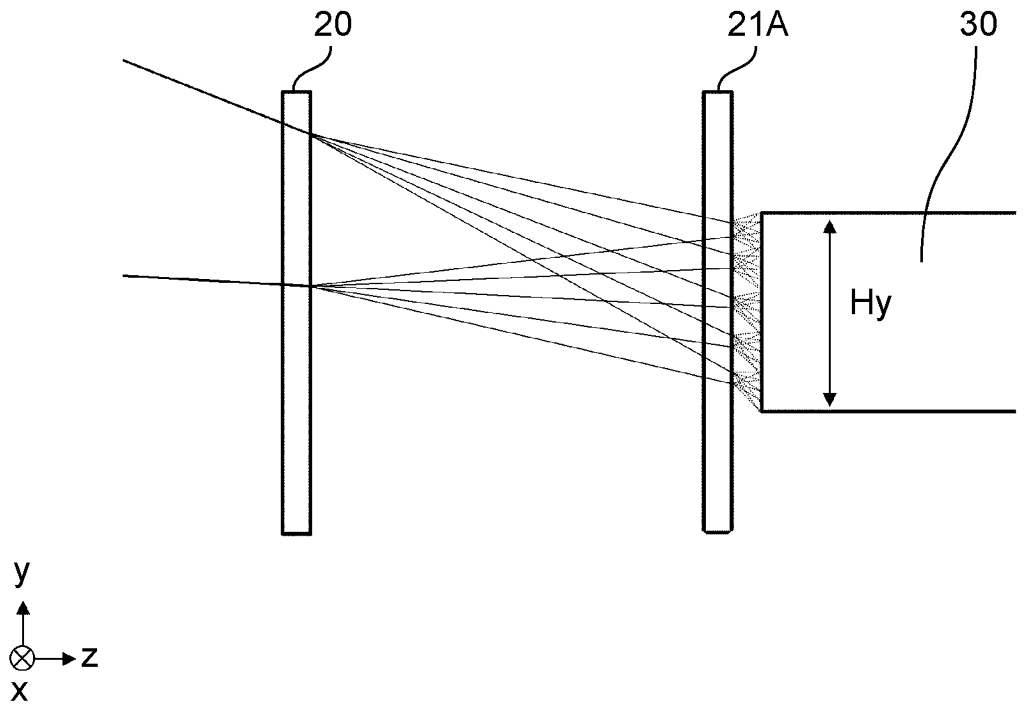
FIG. 17B is a side view illustrating the scene of the diffusion by the diffuser plate according to the second exemplary embodiment.

FIG. 17B is a side view (y-z cross-sectional view) illustrating the scene of the diffusion of the light rays by diffuser plate 20 and diffuser plate 21A. For the sake of simplicity, only a light ray on an outermost peripheral side and a light ray near a center are illustrated as the light ray incident on diffuser plate 20. Diffuser plate 20 diffuses a light ray to be incident on a diffusion surface (a surface on an emission side of diffuser plate 20). The light diffused by diffuser plate 20 spreads as the light advances in a z direction, and illuminates diffuser plate 21A with a wide area to a certain extent. Diffuser plate 21A further diffuses the light diffused by diffuser plate 20 on a diffusion surface (a surface on an emission side of diffuser plate 21A). Specifically, the light ray incident on diffuser plate 21A at an angle formed by the optical axis in the y direction and diffusion angle component θ2 (second diffusion angle component) is diffused by diffuser plate 21A by being further given diffusion angle ΔΘ2 (second diffusion angle, $\Delta\Theta2=\alpha_y/2$) in the y direction. The light diffused by diffuser plate 21A is incident on rod integrator 30. Since a light density is relaxed by diffuser plate 20 without concentrating the light at one point near the incident surfaces of diffuser plate 21A and rod integrator 30, damage to diffuser plate 21A and rod integrator 30 can be prevented. Since diffuser plate 20 illuminates a wide region of diffuser plate 21A, a light uniformizing effect can be enhanced, and uniformity of projection light and speckle noise reduction can be achieved.

It is preferable that a degree of diffusion by diffuser plate 20 be increased as much as possible to an extent that the incident light is not lost with respect to width Hy in the y direction of rod integrator 30.

Movement mechanism 22 is a mechanism that vibrates diffuser plate 21A in the x direction at a constant cycle. Movement mechanism 22 vibrates diffuser plate 21A, and thus, coherence can be reduced. Note that, the movement of diffuser plate 21A may be performed such that diffuser plate 21A does not move in a rotation direction, and may be vibration in the y direction or swing movement. An arrangement location of diffuser plate 20 is not limited to between mirror 145 and diffuser plate 21 illustrated in FIG. 11, and may be between lens 121 and lens 122, or may be between light source device 60 and lens 121 as long as the arrangement location is between light source device 60 (solid-state light source array) and diffuser plate 21A.

Figure 18A:
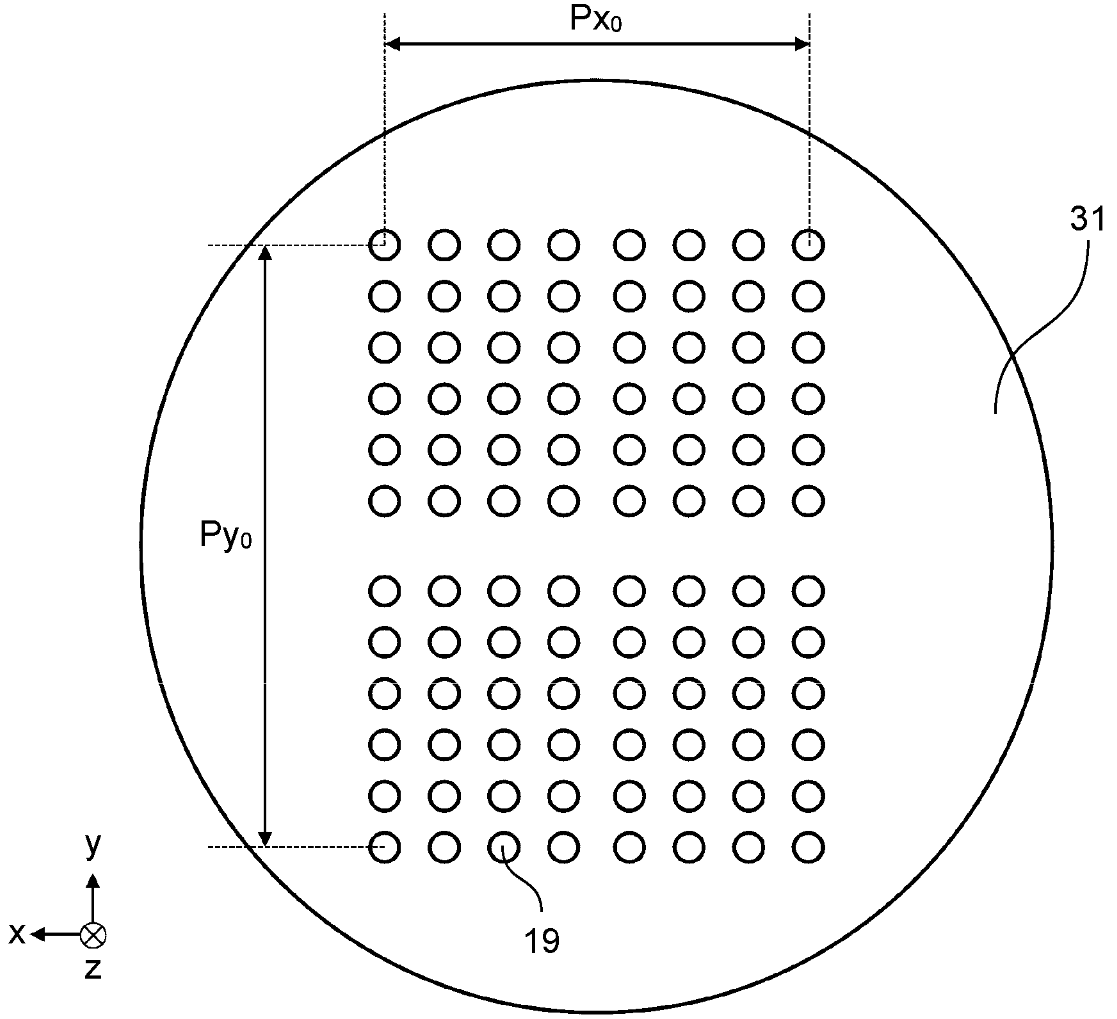
FIG. 18A is a diagram illustrating an angle distribution of light incident on rod integrator 30 in a comparative example of the second exemplary embodiment.

FIG. 18A is a schematic diagram illustrating an angle distribution of light incident on rod integrator 30 when diffuser plate 21A is not provided as a comparative example. Since the light emitted from light source device 60 is concentrated by lens 121 and lens 122, the angle distribution of FIG. 18A is substantially similar to the light flux distribution emitted from light source device 10 illustrated in FIG. 14. That is, a ratio between light flux width Wx and light flux width Wy in FIG. 14 and a ratio between angle distribution width $Px_0$ in the x direction and angle distribution width $Py_0$ in the y direction in FIG. 18A are substantially equal ($Wx:Wy \approx Px_0:Py_0$), and thus, angle distribution width $Px_0$ in the x direction is smaller than angle distribution width $Py_0$ in the y direction ($Px_0<Py_0$). In FIG. 18A, the distribution of images 19 of the emitters has more tolerance with respect to maximum allowable incident angle 31 to rod integrator 30 in the x direction than the y direction.

Figure 18B:
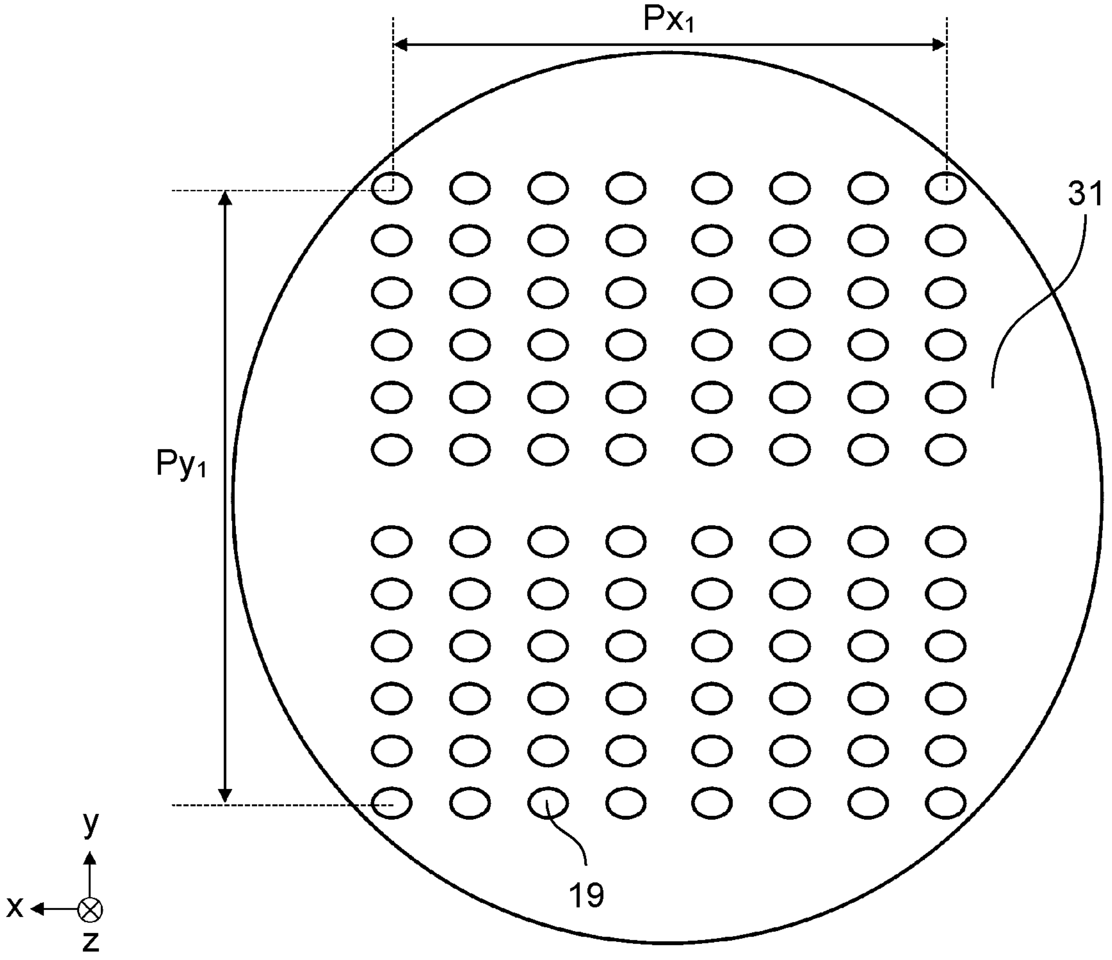
FIG. 18B is a diagram illustrating an angle distribution of light incident on rod integrator 30 according to the second exemplary embodiment.

FIG. 18B is a schematic diagram illustrating an angle distribution of light incident on rod integrator 30 when diffuser plate 21A is provided (second exemplary embodiment). In the second exemplary embodiment, since diffuser plate 21A has characteristics that the light is strongly diffused in the x direction rather than the y direction, FIG. 18B has an angle distribution in which the angle distribution of FIG. 18A is extended in the x direction, and angle distribution width $Px_1$ in the x direction and angle distribution width $Py_1$ in the y direction are substantially identical ($Px_1 \approx Py_1$). Accordingly, in the second exemplary embodiment, the angle distribution of the incident light is distributed (that is, an aspect ratio of the angle distribution of the incident light is approximately 1) in the same range in the x direction and the y direction with respect to maximum allowable incident angle 31 to rod integrator 30, and the angle distribution is expanded to the utmost extent. At this time, the diffusion characteristics of diffuser plate 21A are characteristics that a difference between the components (diffusion angle components) in the x direction and the y direction at the incident angle of the incident light on diffuser plate 21A is corrected such that the aspect ratio of the angle distribution formed by images 19 of the emitters becomes approximately 1 by an anisotropic diffusion angle. That is, the sum of the angle (diffusion angle component Θ1) of the incident light with respect to the optical axis in the x direction and diffusion angle ΔΘ1 is substantially equal to the sum of the angle (diffusion angle component Θ2) of the incident light with respect to the optical axis in the y direction and diffusion angle ΔΘ2 (Θ1+ΔΘ1≈Θ2+ΔΘ2). Image 19 of each emitter appearing on the angle distribution of FIG. 18B has an elliptical shape that is greatly extended in the x direction rather than the y direction.

Meanwhile, as a method for effectively suppressing speckle noise in a projection display apparatus using a laser light source having high coherence, there is a method for multiplexing angles of light rays incident on one point of a screen by angle superimposition. Specifically, in an exit pupil of projection unit 50, it is preferable that a pupil diameter be increased and a light intensity distribution be flattened on the pupil. The light intensity distribution on the exit pupil of projection unit 50 and the angle distribution of the incident light on rod integrator 30 have a correlation. Accordingly, although FIGS. 18A and 18B have been described as the light intensity distribution of the incident light on rod integrator 30, the intensity distribution can be simultaneously read as the light intensity distribution (spatial distribution) on the exit pupil of projection unit 50, and a circle indicated by maximum allowable incident angle 31 can be read as an exit pupil diameter of projection unit 50.

As described above, in the second exemplary embodiment, since the light intensity distribution is as close as possible to a size of the exit pupil diameter in the exit pupil of projection unit 50 as illustrated in FIG. 18B, the speckle noise can be effectively reduced by the effect of the angle superimposition as described above, and a light loss can also be reduced since the light intensity distribution falls within the exit pupil diameter.

Actions and Effects

When the light intensity distribution emitted from light source device 60 is longer in the y direction than in the x direction, the aspect ratio of the angle distribution of the light incident on rod integrator 30 is set to approximately 1 by diffuser plate 21A that diffuses more strongly in the x direction than in the y direction, and the light intensity distribution is expanded near the maximum allowable incident angle. Thus, the light loss is small, and the speckle noise can be effectively reduced.

Since the light intensity distribution emitted from light source device 60 is longer in the y direction than in the x direction, bent portions of mirror 144 and mirror 145 can be compact.

Third Exemplary Embodiment

Figure 19:
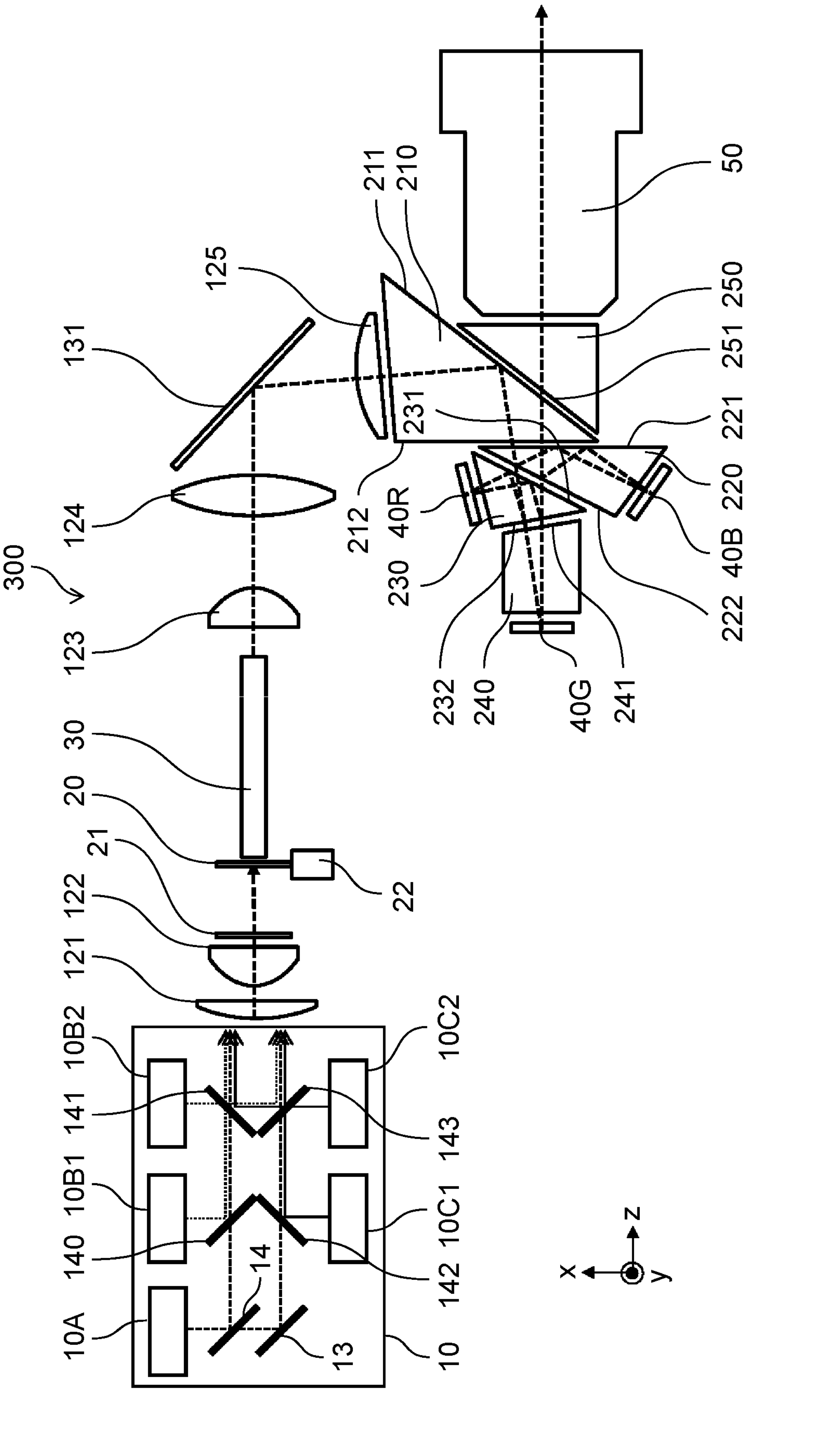
FIG. 19 is a projection display apparatus according to a third exemplary embodiment.

FIG. 19 is a diagram illustrating a projection display apparatus according to a third exemplary embodiment. The identical components of projection display apparatus 300 of the third exemplary embodiment as the components of projection display apparatus 100 of the first exemplary embodiment are denoted by the same reference marks, and a detailed description thereof will be omitted. Projection display apparatus 300 is different from projection display apparatus 100 of the first exemplary embodiment in that diffuser plate 21 (first diffuser plate) is disposed away from rod integrator 30, and diffuser plate 20 (second diffuser plate) is disposed between diffuser plate 21 and rod integrator 30. Diffuser plate 20 includes movement mechanism 22. Movement mechanism 22 vibrates diffuser plate 20 in an x direction at a constant cycle. Movement mechanism 22 vibrates diffuser plate 20, and thus, coherence can be reduced. Note that, the movement of diffuser plate 20 may be vibration in a y direction, vibration in a rotation direction, or swing movement. Note that, diffuser plate 21 may be vibrated at a constant cycle by a movement mechanism. In this case, since the diffusion characteristics of diffuser plate 21 are anisotropic, it is necessary to vibrate diffuser not to move in the rotation direction. Coherence can be further reduced by vibrating diffuser plate 21.

Figure 20A:
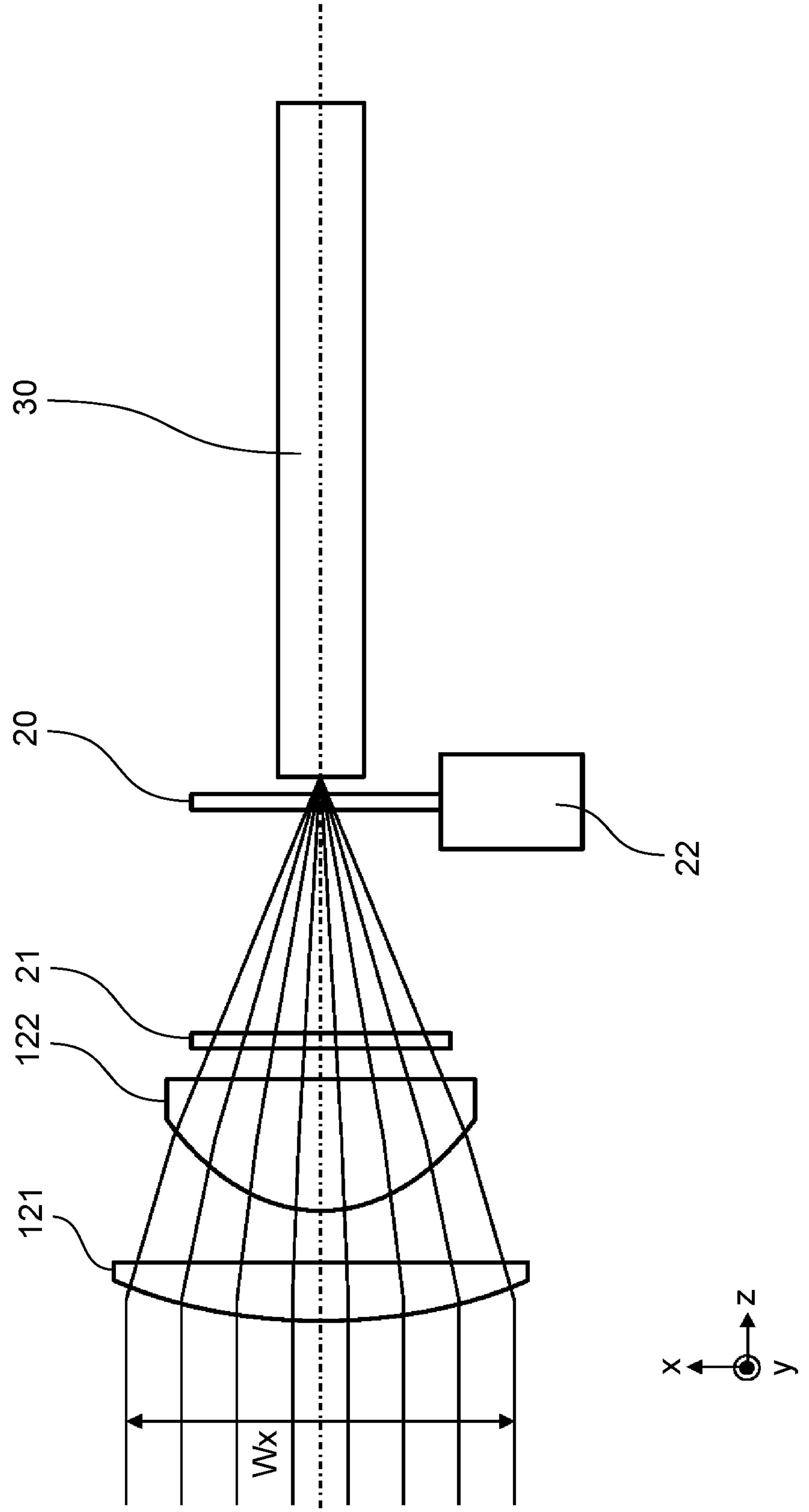
FIG. 20A is a top view illustrating a scene of a light ray according to the third exemplary embodiment.
Figure 20B:
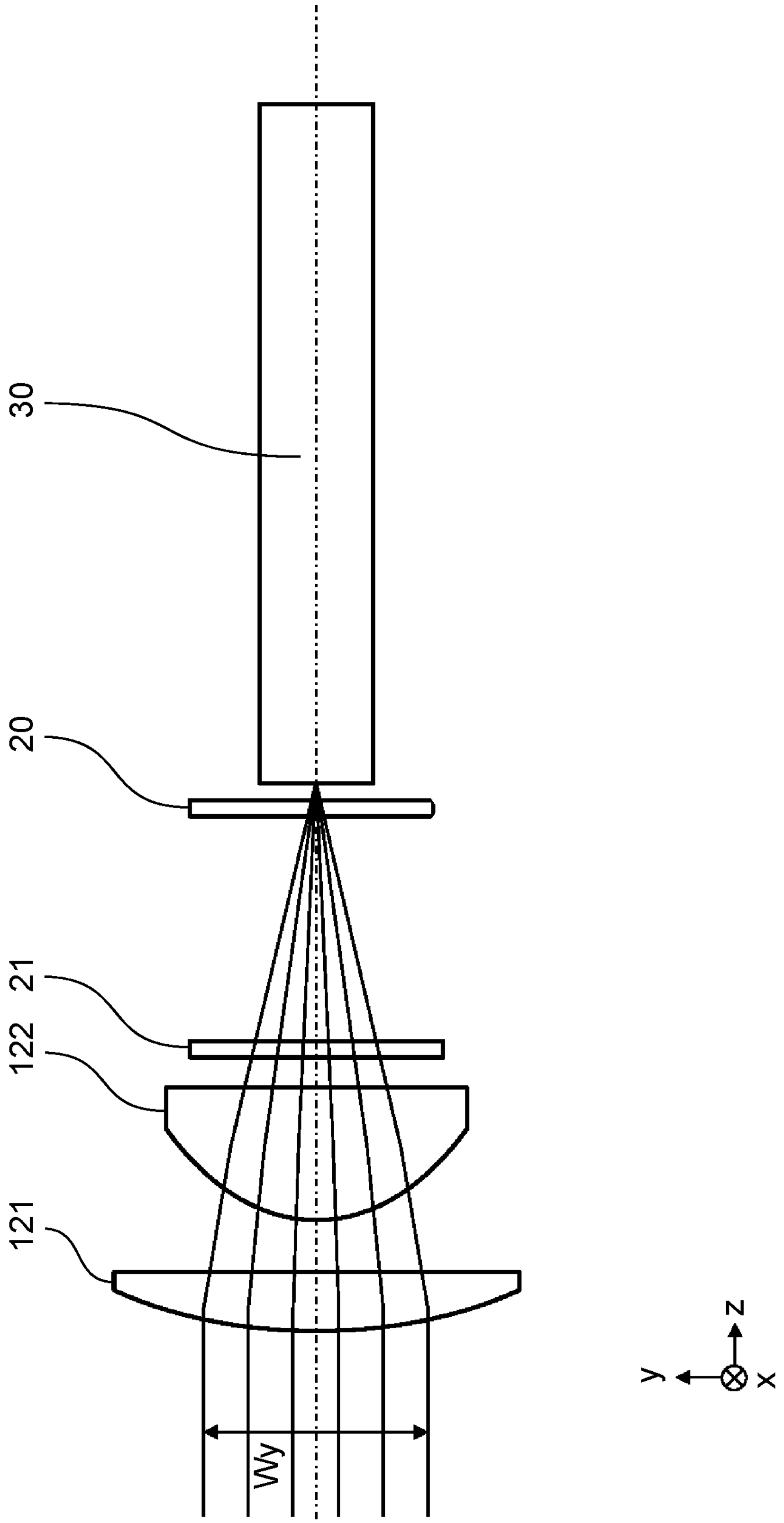
FIG. 20B is a side view illustrating the scene of the light ray according to the third exemplary embodiment.

FIGS. 20A and 20B are a top view (x-z cross-sectional view) and a side view (y-z cross-sectional view) illustrating scenes of a light ray in which the light emitted from light source device 10 according to the third exemplary embodiment enters rod integrator 30, respectively. Diffuser plate 21 and diffuser plate 20 are arranged differently from the first exemplary embodiment.

Figure 21A:
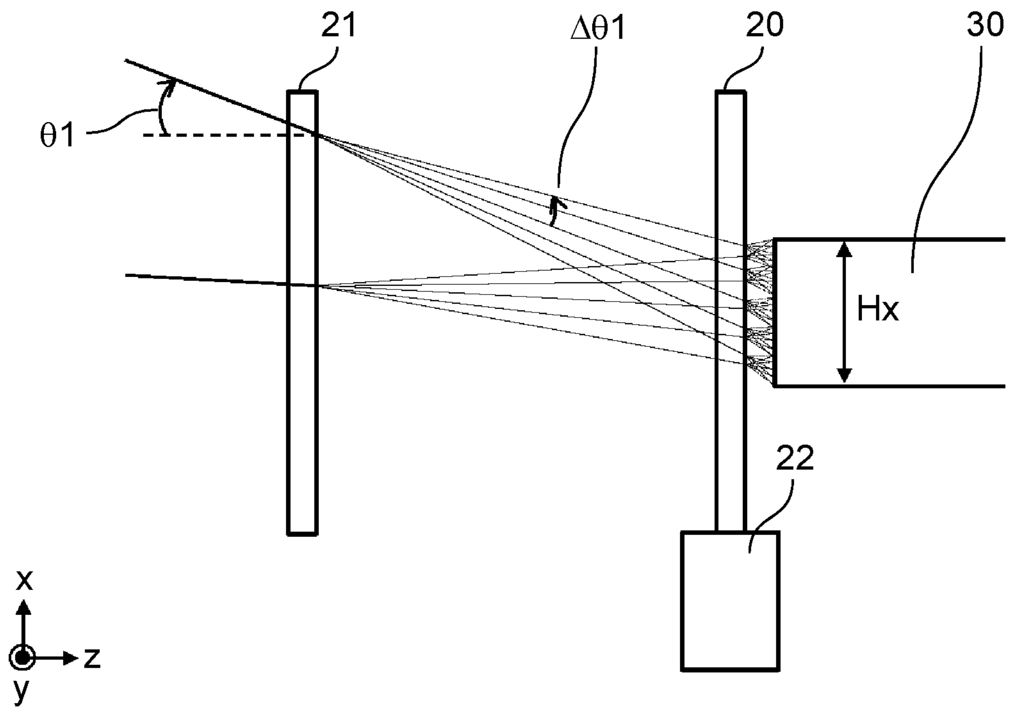
FIG. 21A is a top view illustrating a scene of diffusion by a diffuser plate according to the third exemplary embodiment.
Figure 21B:
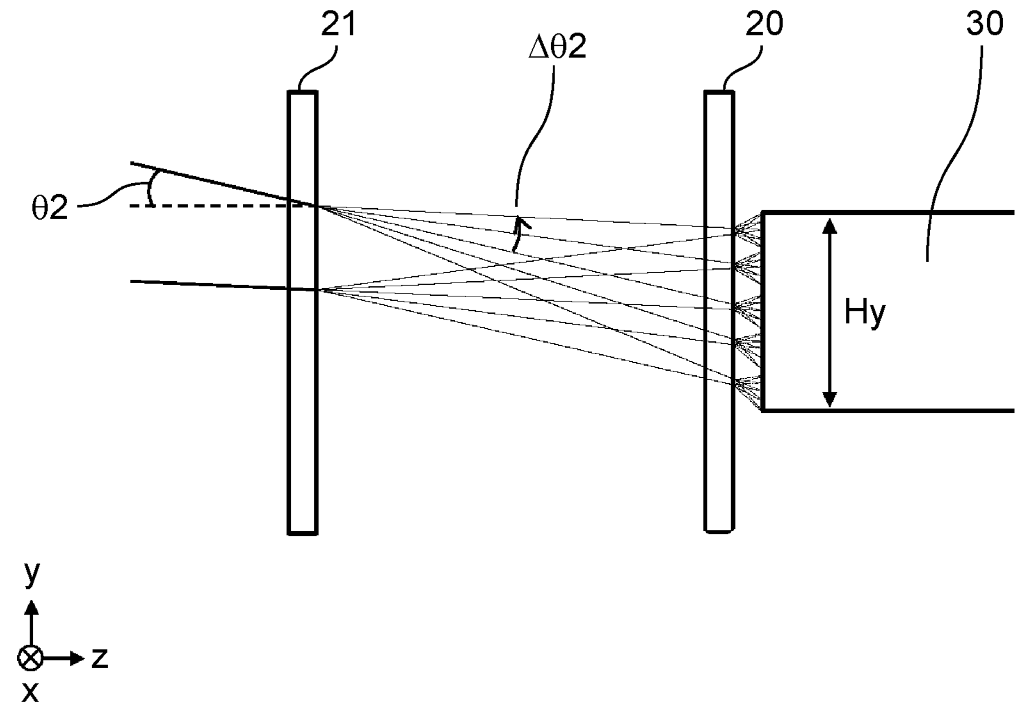
FIG. 21B is a side view illustrating the scene of the diffusion by the diffuser plate according to the third exemplary embodiment.

FIGS. 21A and 21B are a top view (x-z cross-sectional view) and a side view (y-z cross-sectional view) illustrating scenes of the diffusion of the light rays by diffuser plate 21 and diffuser plate 20 according to the third exemplary embodiment, respectively. The light ray emitted from light source device 10 is incident on diffuser plate 21 at an angle formed by an optical axis in the x direction and diffusion angle component 81 (first diffusion angle component), is further given diffusion angle ΔΘ1 (first diffusion angle) in the x direction by diffuser plate 21, and becomes a light ray having diffusion angle (Θ1+ΔΘ) of the sum of diffusion angle component Θ1 and diffusion angle ΔΘ1 in the x direction. Similarly, the light ray emitted from light source device 10 is incident on diffuser plate 21 at an angle formed by an optical axis in the y direction and diffusion angle component Θ2 (second diffusion angle component), is further given diffusion angle ΔΘ2 (second diffusion angle) in the y direction by diffuser plate 21, and becomes a light ray having diffusion angle (Θ2+ΔΘ2) of the sum of diffusion angle component Θ2 and diffusion angle ΔΘ2 in the y direction. Diffusion angle (Θ1+ΔΘ1) in the x direction and diffusion angle (Θ2+ΔΘ2) in the y direction substantially coincide, and the light ray passes through diffuser plate 20, and is incident on rod integrator 30 by being further given an equal diffusion angle in the x direction and the y direction.

Figure 22:
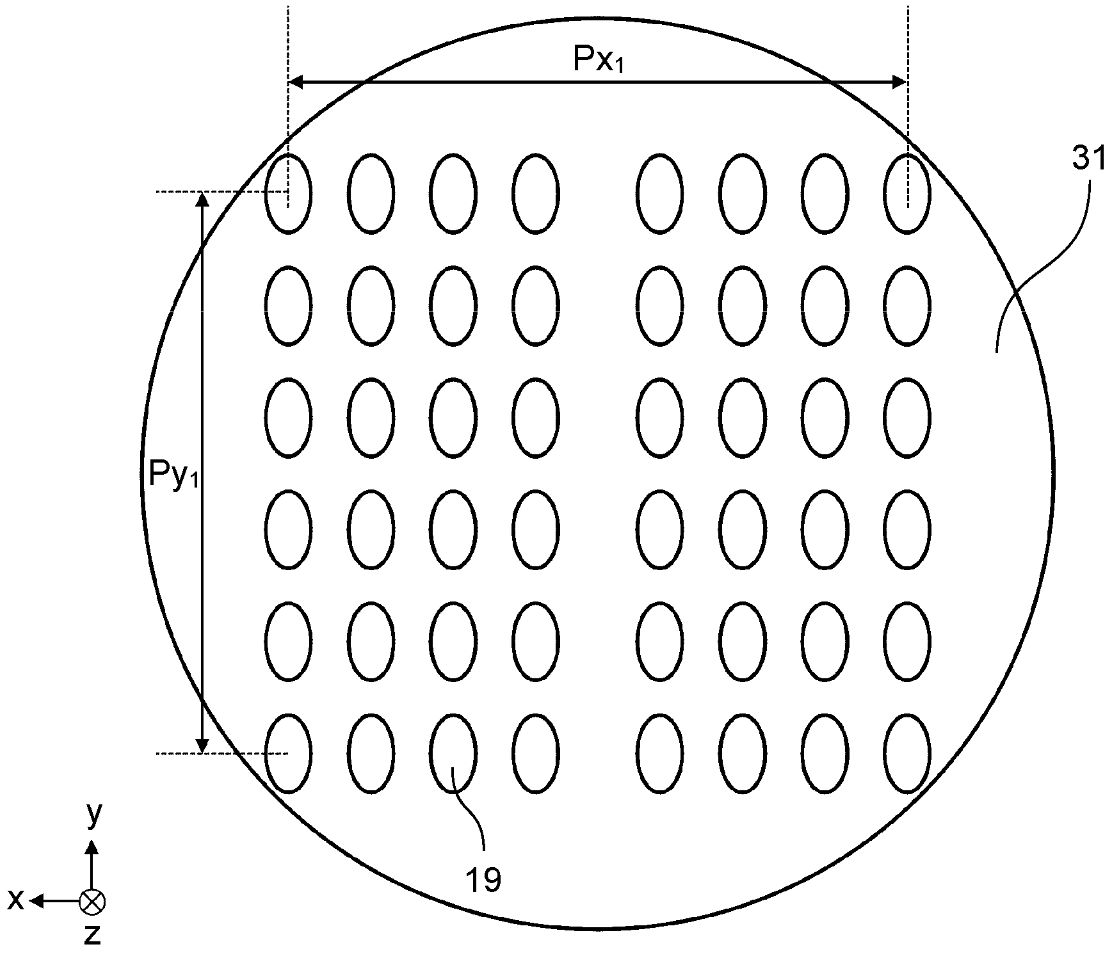
FIG. 22 is a diagram illustrating an angle distribution of light incident on rod integrator 30 according to the third exemplary embodiment.

FIG. 22 is a schematic diagram illustrating an angle distribution of light incident on rod integrator 30. Similarly to the first exemplary embodiment (FIG. 10B), since diffuser plate 21 has characteristics that the light is more strongly diffused in the y direction than in the x direction, the angle distribution in FIG. 10A is extended in the y direction, and angle distribution width $Px_1$ in the x direction and angle distribution width $Py_1$ in the y direction are substantially identical ($Px_1 \approx Py_1$). Image 19 of each emitter appearing on the angle distribution in FIG. 22 has an elliptical shape that is greatly extended in the y direction rather than the x direction.

Figure 23:
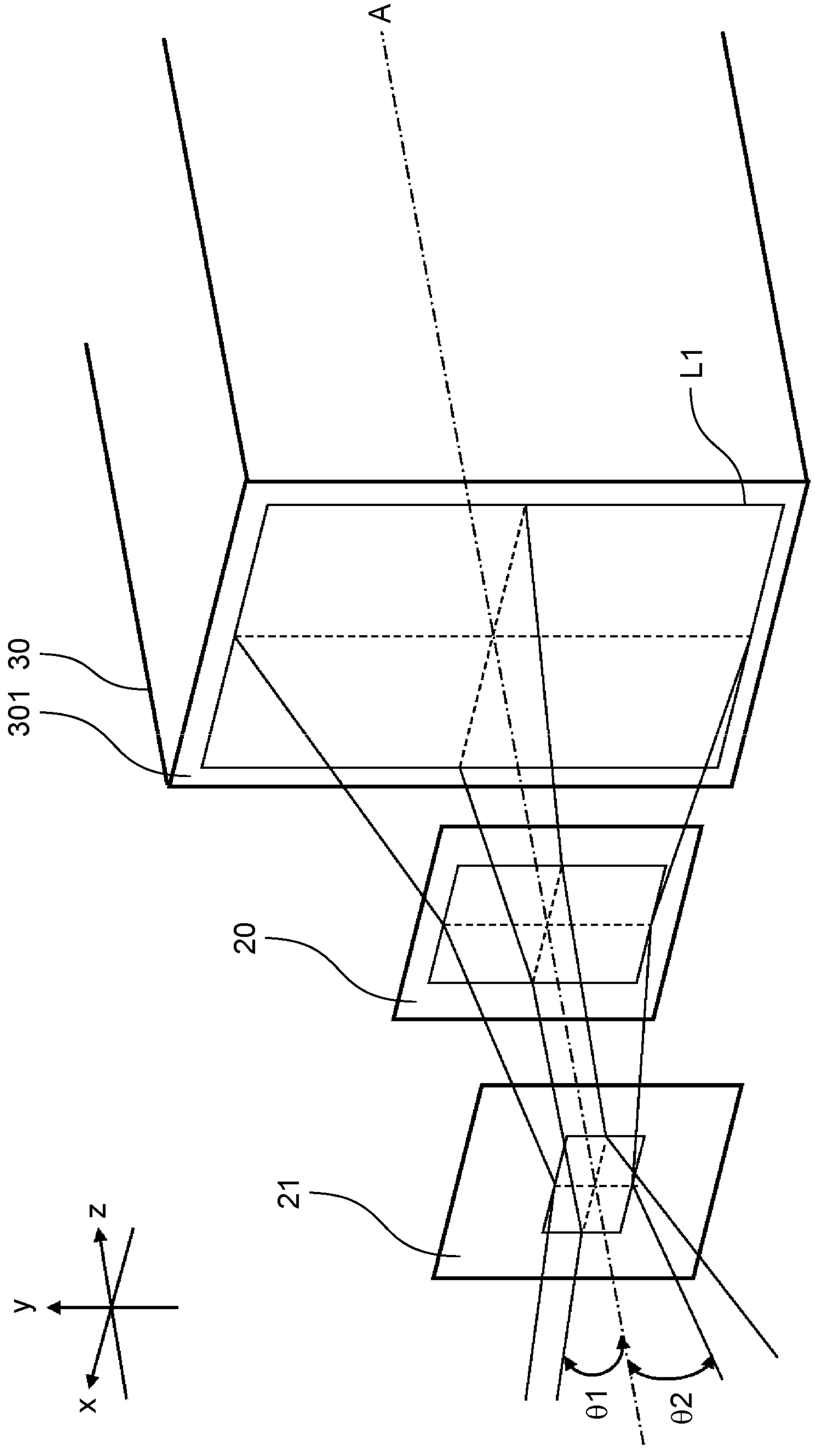
FIG. 23 is a schematic diagram illustrating a scene of diffusion by a diffuser plate according to the third exemplary embodiment.

Next, a light intensity distribution on an incident surface of the rod integrator will be described. FIG. 23 is a schematic diagram illustrating the scene of the diffusion by the diffuser plate according to the third exemplary embodiment, FIG. 24A is a diagram illustrating the light intensity distribution on the incident surface of the rod integrator according to the first exemplary embodiment, and FIG. 24B is a diagram illustrating the light intensity distribution on the incident surface of the rod integrator according to the third exemplary embodiment.

Figure 24A:
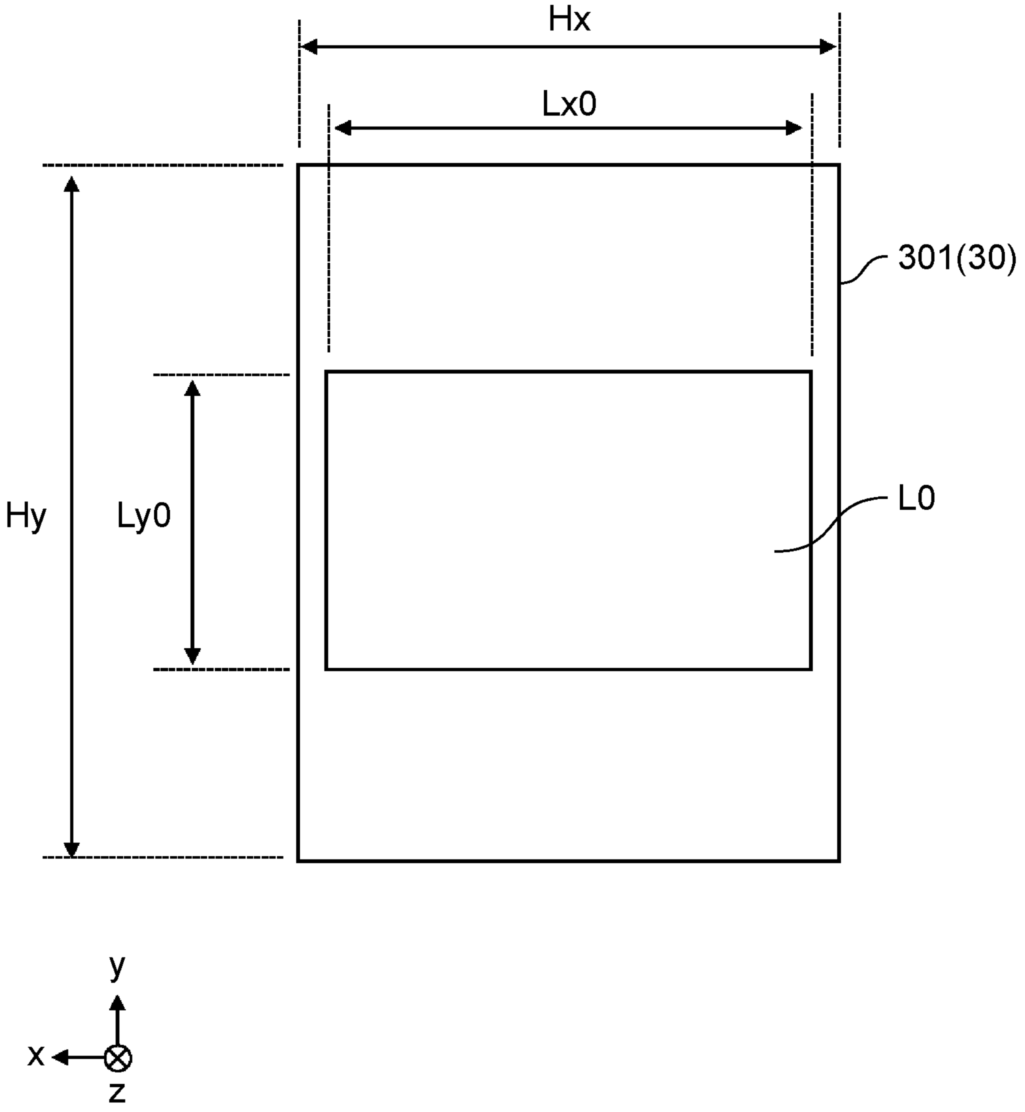
FIG. 24A is a diagram illustrating a light intensity distribution on an incident surface of a rod integrator according to the first exemplary embodiment.

In projection display apparatus 100 described in the first exemplary embodiment, as illustrated in FIG. 24A, the light flux is distributed in light flux distribution range L0 with respect to rod integrator incident surface 301. In projection display apparatus 100, since a distance between diffuser plate 21 having anisotropic diffusion characteristics and rod integrator incident surface 301 is small and an effect of expanding the light flux distribution in the y direction by diffuser plate 21 is limited, an aspect ratio of light flux distribution range $L_0$, that is, a ratio between length Lx0 in the x direction and length Ly0 in the y direction substantially coincides with a ratio between light flux width Wx and light flux width Wy illustrated in FIGS. 20A and 20B. Thus, when an aspect ratio of light flux L emitted from light source device 10 is different from an aspect ratio of a cross-sectional shape of the rod integrator, that is, a ratio of width Hx in the x direction and width Hy in the y direction of rod integrator 30, the light flux cannot illuminate entire rod integrator incident surface 301.

Figure 24B:
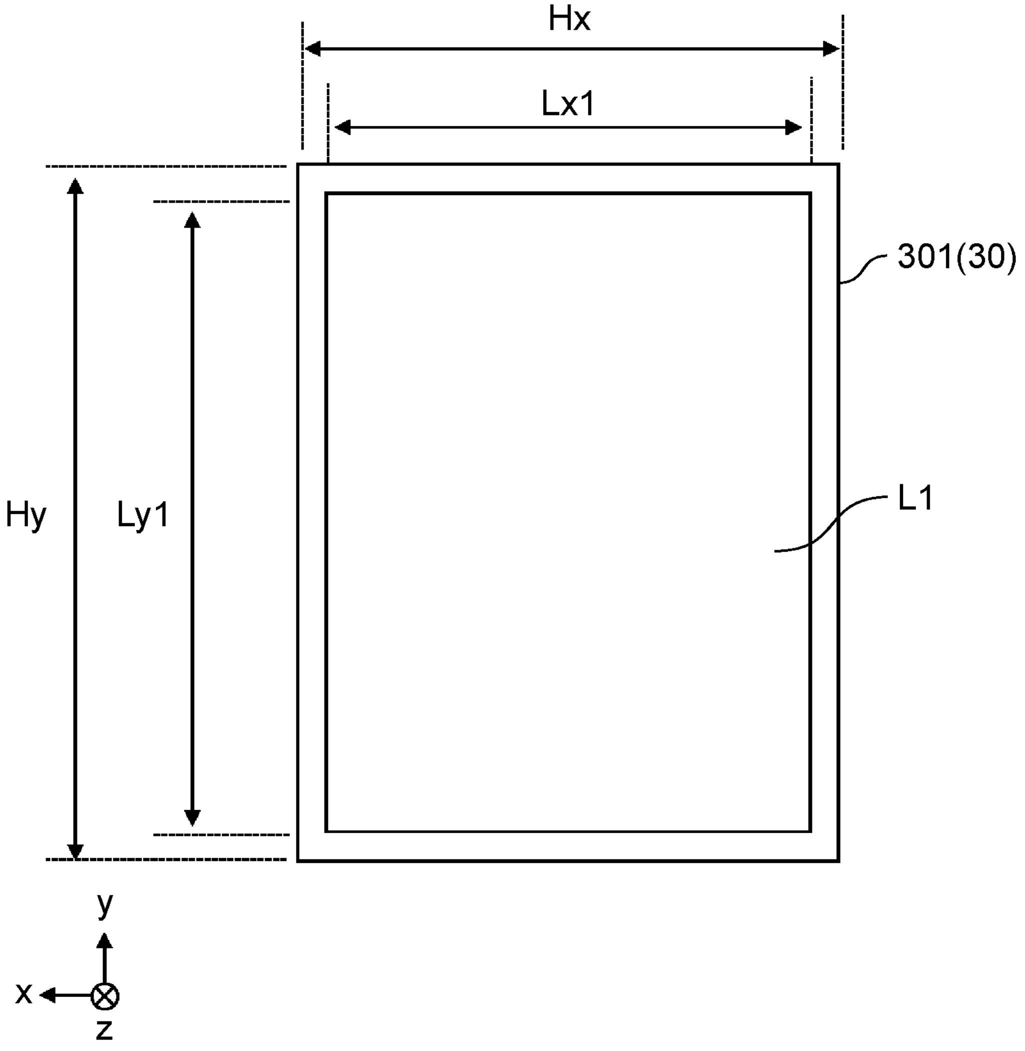
FIG. 24B is a diagram illustrating a light intensity distribution on an incident surface of a rod integrator according to the third exemplary embodiment.

On the other hand, in projection display apparatus 300 of the third exemplary embodiment, as illustrated in FIGS. 23 and 24B, the light flux is distributed in light flux distribution range L1 with respect to rod integrator incident surface 301. In the third exemplary embodiment, diffuser plate 21 having different diffusion characteristics in the x direction and the y direction is disposed away from rod integrator incident surface 301 as compared with projection display apparatus 100 of the first exemplary embodiment. Thus, after the light is transmitted through diffuser plate 21, the aspect ratio of the light flux can be changed relatively largely. Specifically, since diffuser plate 21 has the diffusion characteristics illustrated in FIG. 7, the light flux width of light flux L transmitted through diffuser plate 21 is larger in the y direction than in the x direction. Thus, the aspect ratio of light flux distribution range L1 of rod integrator incident surface 301, that is, the ratio between length Lx1 in the x direction and length Ly1 in the y direction can substantially coincide with the aspect ratio of the cross-sectional shape of the rod integrator, that is, the ratio between width Hx in the x direction and width Hy in the y direction of rod integrator 30, and entire rod integrator incident surface 301 can be uniformly illuminated.

Figure 25A:
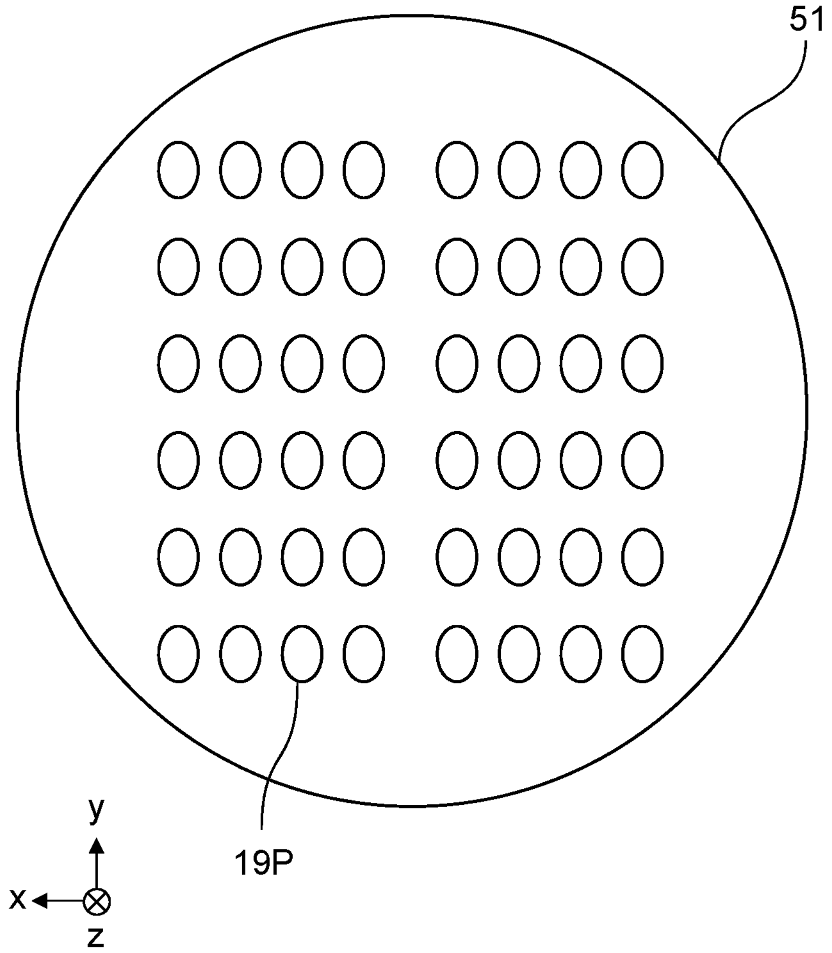
FIG. 25A is a diagram illustrating a light intensity distribution according to the first exemplary embodiment.
Figure 25B:
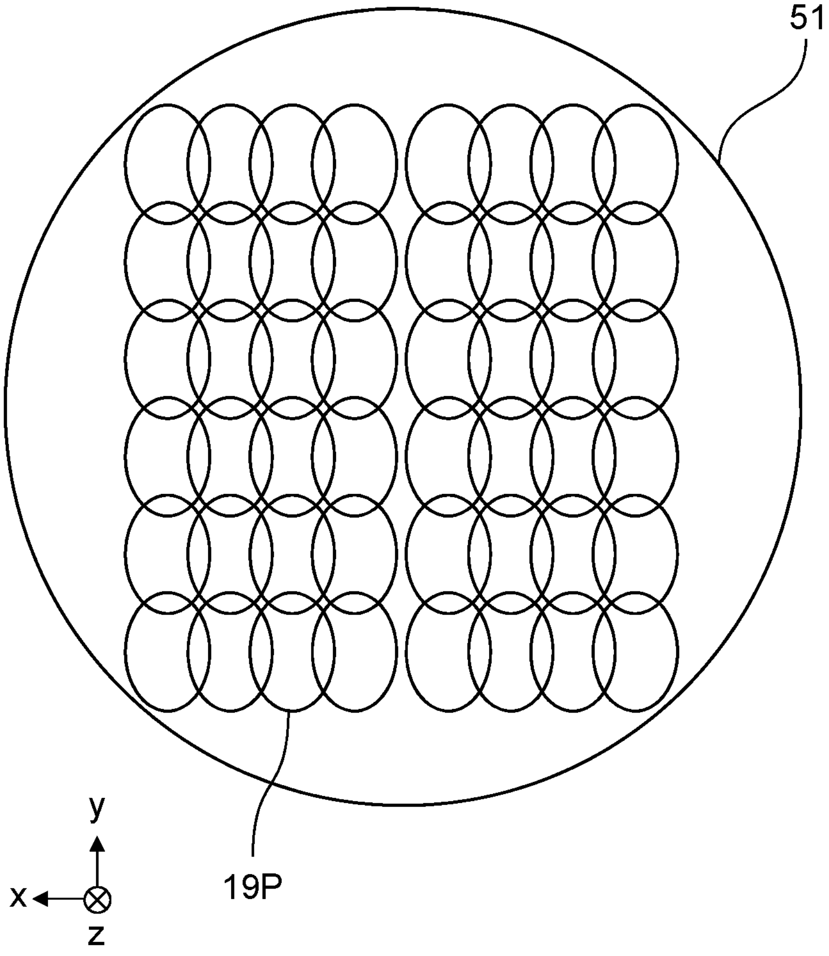
FIG. 25B is a diagram illustrating a light intensity distribution according to the third exemplary embodiment.

FIGS. 25A and 25B illustrate a light intensity distribution in exit pupil 51 in a projection lens. In the light intensity distribution in the first exemplary embodiment illustrated in FIG. 25A, an aspect ratio of the distribution range is approximately 1, but the spread of image 19P of each emitter on exit pupil 51 is small, and a ratio (filling factor) of image 19P of the emitter to exit pupil 51 is low. On the other hand, in the light intensity distribution in the third exemplary embodiment illustrated in FIG. 25B, the spread of images 19P of the emitters is increased to an extent that the images are superimposed, and the filling factor is improved. Since a size of image 19P of each emitter is determined according to a size of the light flux incident on rod integrator 30, the filling factor of the light intensity distribution on the exit pupil in the projection lens is improved by uniformly illuminating entire rod integrator incident surface 301 with the light flux in the third exemplary embodiment.

Actions and Effects

When the light flux is incident on the rod integrator, the angle distribution of the light ray has an aspect ratio of approximately 1 as in the first and second exemplary embodiments, and the aspect ratio of the light ray distribution range on the rod integrator incident surface substantially coincides with the aspect ratio of the cross-sectional shape of the rod integrator incident surface. As a result, the entire rod integrator incident surface is uniformly illuminated, the distribution in the exit pupil in the projection lens is further uniformized, and the speckle noise can be more effectively reduced.

Note that, in projection display apparatus 200 of the second exemplary embodiment, the projection display apparatus that uniformly illuminates the entire rod integrator incident surface with the light flux from light source device 10 can be constructed by replacing the positions of diffuser plate 20 and diffuser plate 21A with each other and using the rod integrator having the rectangular cross-sectional shape in which the cross-sectional shape of the rod integrator incident surface is long in the x direction.

The present disclosure is applicable to a projection display apparatus such as a projector.

What is claimed is:

1. A projection display apparatus, comprising:
- a solid-state light source array that includes a plurality of solid-state light sources; and
- a first diffuser plate that diffuses light emitted from the solid-state light source array;
- wherein
- the first diffuser plate has different diffusion characteristics in a first direction and a second direction intersecting the first direction, such that a diffusion angle in the second direction is larger than a diffusion angle in the first direction,
- the solid-state light source array includes a plurality of emitters,
- the larger diffusion angle in the second direction provided by the first diffuser plate causes each of a plurality of spots of light emitted from respective ones of the plurality of emitters and transmitted through the first diffuser plate to have a length in the second direction that is greater than a length in the first direction,
- the light emitted from the solid-state light source array has a first diffusion angle component in the first direction and a second diffusion angle component in the second direction, and is incident on the first diffuser plate,
- the first diffuser plate has diffusion characteristics of a first diffusion angle in the first direction and a second diffusion angle in the second direction, and
- a sum of the first diffusion angle component and the first diffusion angle substantially coincides with a sum of the second diffusion angle component and the second diffusion angle.

2. The projection display apparatus according to claim 1, further comprising a movement mechanism that vibrates the first diffuser plate in the first direction or the second direction at a certain cycle.

3. The projection display apparatus according to claim 1, further comprising a second diffuser plate that has a substantially same diffusion characteristics in the first direction and the second direction, wherein the second diffuser plate is disposed between the solid-state light source array and the first diffuser plate.

4. The projection display apparatus according to claim 1, wherein each of the plurality of solid-state light sources is a laser diode.

5. The projection display apparatus according to claim 1, further comprising:

a light uniformizing element that uniformizes the light diffused by the first diffuser plate; and a second diffuser plate that has a substantially same diffusion characteristics in the first direction and the second direction, wherein the second diffuser plate is disposed between the first diffuser plate and the light uniformizing element.

6. The projection display apparatus according to claim 3, further comprising a movement mechanism that vibrates the second diffuser plate in the first direction or the second direction at a certain cycle.

7. The projection display apparatus according to claim 5, further comprising a movement mechanism that vibrates the second diffuser plate in the first direction or the second direction at a certain cycle.

8. The projection display apparatus according to claim 1, wherein the solid-state light source array includes a first solid-state light source array and a second solid-state light source array, the projection display apparatus further comprises:

a light combiner for combing the light emitted respectively from the first solid-state light source array and the second solid-state light source array; and a lens transmitting light flux emitted from the light combiner, the first solid-state light source array is disposed on a first side, the second solid-state light source array is disposed on a second side that is opposite to the first side with respect to an optical axis of the lens, and the light emitted from the first solid-state light source array and the light emitted from the second solid-state light source array incident on the lens are adjacent to each other in the first direction.

9. The projection display apparatus according to claim 1, further comprising:

a light uniformizing element that uniformizes the light diffused by the first diffuser plate;

a light modulation element that modulates the light uniformized by the light uniformizing element with an image signal to generate image light; and a projection unit that projects the image light generated by the light modulation element.

10. The projection display apparatus according to claim 9, wherein the light uniformizing element is a rod integrator.

11. A projection display apparatus, comprising:

a solid-state light source array that includes a plurality of solid-state light sources; and a first diffuser plate that diffuses light emitted from the solid-state light source array;

wherein the first diffuser plate has different diffusion characteristics in a first direction and a second direction intersecting the first direction, such that a diffusion angle in the second direction is larger than a diffusion angle in the first direction, the solid-state light source array includes a plurality of emitters, the larger diffusion angle in the second direction provided by the first diffuser plate causes each of a plurality of spots of light emitted from respective ones of the plurality of emitters and transmitted through the first diffuser plate to have a length in the second direction that is greater than a length in the first direction, and the first diffuser plate allows the light emitted from the solid-state light source array to be transmitted through the first diffuser plate to diffuse the light emitted to have an aspect ratio of an angle distribution that is approximately 1.

12. The projection display apparatus according to claim 11, further comprising a movement mechanism that vibrates the first diffuser plate in the first direction or the second direction at a certain cycle.

13. The projection display apparatus according to claim 11, further comprising a second diffuser plate that has a substantially same diffusion characteristics in the first direction and the second direction, wherein the second diffuser plate is disposed between the solid-state light source array and the first diffuser plate.

14. The projection display apparatus according to claim 11, wherein each of the plurality of solid-state light sources is a laser diode.

15. The projection display apparatus according to claim 11, further comprising:

a light uniformizing element that uniformizes the light diffused by the first diffuser plate; and a second diffuser plate that has a substantially same diffusion characteristics in the first direction and the second direction, wherein the second diffuser plate is disposed between the first diffuser plate and the light uniformizing element.

16. The projection display apparatus according to claim 13, further comprising a movement mechanism that vibrates the second diffuser plate in the first direction or the second direction at a certain cycle.

17. The projection display apparatus according to claim 15, further comprising a movement mechanism that vibrates the second diffuser plate in the first direction or the second direction at a certain cycle.

18. The projection display apparatus according to claim 11, wherein the solid-state light source array includes a first solid-state light source array and a second solid-state light source array, the projection display apparatus further comprises:

a light combiner for combing the light emitted respectively from the first solid-state light source array and the second solid-state light source array; and a lens transmitting light flux emitted from the light combiner, the first solid-state light source array is disposed on a first side, the second solid-state light source array is disposed on a second side that is opposite to the first side with respect to an optical axis of the lens, and the light emitted from the first solid-state light source array and the light emitted from the second solid-state light source array incident on the lens are adjacent to each other in the first direction.

19. The projection display apparatus according to claim 11, further comprising:

a light uniformizing element that uniformizes the light diffused by the first diffuser plate;

a light modulation element that modulates the light uniformized by the light uniformizing element with an image signal to generate image light; and a projection unit that projects the image light generated by the light modulation element.

20. The projection display apparatus according to claim 19, wherein the light uniformizing element is a rod integrator.

* * * * *